US011892616B2

(12) United States Patent
Prendergast et al.

(10) Patent No.: US 11,892,616 B2
(45) Date of Patent: Feb. 6, 2024

(54) NIGHT VISION GOGGLE SYSTEM AND APPARATUS

(71) Applicant: NOROTOS, INC., Santa Ana, CA (US)

(72) Inventors: Jonathon R. Prendergast, Newport Beach, CA (US); Ronald R. Soto, Santa Ana, CA (US)

(73) Assignee: NOROTOS, INC., Santa Ana, CA (US)

( * ) Notice: Subject to any disclaimer, the term of this patent is extended or adjusted under 35 U.S.C. 154(b) by 0 days.

(21) Appl. No.: 18/309,719

(22) Filed: Apr. 28, 2023

(65) Prior Publication Data

US 2023/0350187 A1 Nov. 2, 2023

Related U.S. Application Data

(60) Provisional application No. 63/337,148, filed on May 1, 2022.

(51) Int. Cl.
*A42B 3/04* (2006.01)
*G02B 23/12* (2006.01)
*G02B 27/01* (2006.01)

(52) U.S. Cl.
CPC .............. *G02B 23/125* (2013.01); *A42B 3/04* (2013.01); *G02B 27/0176* (2013.01)

(58) Field of Classification Search
CPC ................................ A42B 3/0433; A42B 3/04
USPC ............................................................. 2/422
See application file for complete search history.

(56) References Cited

U.S. PATENT DOCUMENTS 6,087,660 A 7/2000 Morris et al.
6,662,370 B1 * 12/2003 Buchanan, Jr. .......... A42B 3/04 2/6.2
8,087,100 B2 * 1/2012 Aguero ................. A42B 3/042 2/422
11,195,678 B1 * 12/2021 Prendergast ....... H01H 36/0033
2004/0181855 A1 9/2004 Prendergast
2007/0012830 A1 * 1/2007 Prendergast ........... F16M 13/00 248/200
2014/0373423 A1 12/2014 Teetzel et al.

OTHER PUBLICATIONS

Wilcox DPAM Operator Manual, Wilcox Industries, Corp., Apr. 20, 2022, 2 pages.
Wilcox TDS241 DPAM, Wilcox Industries, Corp., 2022, 1 page.
Wilcox Dual Power Aviation Mount, Tactical Night Vision Company, Inc., https://web.archive.org/web/20150912141623/https:/tnvc.com/shop/wilcox-dual-power-aviation-mount/, Sep. 12, 2015, printed May 23, 2023, 5 pages.
U.K. Intellectual Property Office Examination Report, dated Oct. 26, 2023, for Patent Application No. GB2306151.8, 7 pages.

* cited by examiner

*Primary Examiner* — Timothy K Trieu
(74) *Attorney, Agent, or Firm* — Lewis Roca Rothgerber Christie LLP

(57) ABSTRACT

In an embodiment, a goggle helmet mount, includes: a helmet block attachable to a helmet; a chassis including a battery pack case configured to house a battery, and being rotatably coupled to the helmet block such that the chassis is rotatably positionable in a lowered position and in a raised position; and an electrical path electrically coupled to the battery pack case.

29 Claims, 17 Drawing Sheets

110 121 162 121 120 100 111 160 141 161 173 140 142 155 150 170 170I 230 200 210 220 300

NIGHT VISION GOGGLE SYSTEM AND APPARATUS

CROSS REFERENCE TO RELATED APPLICATIONS

This application claims the benefit of, and priority to, U.S. Provisional Application No. 63/337,148, filed in the United States Patent and Trademark Office on May 1, 2022, the entire content of which is hereby incorporated by reference.

BACKGROUND

Helmets are used to protect a person's head and to provide a surface to mount various components that may be useful to the person, such as goggles that enhance the person's night vision or provide other enhancements to the person's vision. In use, the components, such as night vision goggles, mounted on the helmet need to be manipulated to position the components for optimum operation. When the components are not in use, they need to be deactivated and stowed. These actions need to be accomplished quickly, smoothly, safely, and reliably, at times under difficult conditions. Therefore, improvements to night vision goggle systems, apparatus and helmet mounts are desirable.

SUMMARY

According to an aspect, the technology relates to a goggle helmet mount, including a helmet block attachable to a helmet; a chassis including a battery pack case configured to house a battery, and being rotatably coupled to the helmet block such that the chassis is rotatably positionable in a lowered position and in a raised position; and an electrical path electrically coupled to the battery pack case.

In some embodiments, the battery pack case is an integrally formed part of the chassis. In some embodiments, the battery pack case has an elongated shape and is oriented to extend at least partly in an anterior direction. In some embodiments, the battery pack case is oriented such that it extends substantially entirely in the anterior direction in response to the chassis being in the lowered position. In some embodiments, the chassis includes first and second arms extending from the helmet block, and the battery pack case is positioned between the first and second arms of the chassis. In some embodiments, the goggle helmet mount further includes: a magnet fixedly positioned relative to the helmet block; and an electrical switch provided along the electrical path and positionable in an opened configuration, whereby the electrical path is broken at the electrical switch, and in a closed configuration, whereby the electrical path is unbroken across the electrical switch. In some embodiments, the magnet is a permanent magnet, the helmet block includes the magnet, and the magnet is positioned to cause the electrical switch to be in the closed configuration in response to the chassis being in the lowered position, and to be in the opened configuration in response to the chassis being in the raised position. In some embodiments, the chassis is configured to attach to a goggle bridge at an attachment region of the chassis, and the electrical path extends between the battery pack case and the attachment region of the chassis. In some embodiments, the electrical path includes a first wire electrically coupled to a first terminal end of the battery pack case, and a second wire electrically coupled to a second terminal end of the battery pack case opposite to the first end, at least a part of the first wire defines a first path that sequentially extends in a first direction substantially parallel to an elongation direction of the battery pack case between the first and second terminal ends of the battery pack case, bends backwards, and extends in a second direction opposite to the first direction, and at least part of the second wire defines a second path that sequentially extends in the first direction, bends backwards, and extends in the second direction. In some embodiments, the chassis is configured to attach to a fore/aft piece so that the chassis is linearly movable relative to the fore/aft piece along the first and second directions. In some embodiments, the electrical path includes: a first electrical connection defining a first part of the electrical path electrically coupled or couplable between a first terminal end of the battery pack case and a distal end of the first electrical connection; and a second electrical connection defining a second part of the electrical path electrically coupled or couplable between a second terminal end of the battery pack case and a distal end of the second electrical connection, wherein: the first and second electrical connections respectively include first and second wires that are electrically exposed at the distal ends of the first and second electrical connections; or the first and second electrical connections respectively include first and second electrical pogo pins at the distal ends of the first and second electrical connections. In some embodiments, an integrated goggle helmet mount system includes the goggle helmet mount; and a goggle bridge configured to attach to at least one goggle, wherein the chassis is integrally attached to the helmet block, and integrally attached to the goggle bridge, and wherein the electrical path extends from the chassis and through at least part of the goggle bridge. In some embodiments, the integrated goggle helmet mount system, further includes a fore/aft piece that is integrally attached to the chassis and to the goggle bridge, wherein the chassis is linearly movable relative to the fore/aft piece, and wherein the electrical path extends through the fore/aft piece. In some embodiments, the electrical path is configured to be coupled between, or couplable between, the battery pack case and a goggle attachment region of the goggle bridge where the goggle bridge is configured to attach to a goggle of the at least one goggles.

According to an aspect, the technology relates to a goggle helmet mount, including: a helmet block attachable to a helmet; a chassis coupled to the helmet block, and including a battery pack case configured to house a battery, the battery pack case being elongated and oriented to extend at least partly in an anterior direction; and an electrical path electrically coupled to the battery pack case.

In some embodiments, the battery pack case is oriented to extend substantially entirely in the anterior direction. In some embodiments, the chassis includes first and second arms extending from the helmet block, and the battery pack case is positioned between the first and second arms of the chassis. In some embodiments, the chassis is rotatably coupled to the helmet block such that the chassis is rotatably positionable in a lowered position and in a raised position, and the battery pack case is oriented to extend at least partly, or substantially entirely, in the anterior direction when the chassis is in the lowered position. In some embodiments, goggle helmet mount further includes an electrical switch provided along the electrical path and positionable in an opened configuration, whereby the electrical path is broken at the electrical switch, and in a closed configuration, whereby the electrical path is unbroken across the electrical switch, wherein the helmet block includes a magnet positioned to cause the electrical switch to be in the closed configuration in response to the chassis being in the lowered position, and to be in the opened configuration in response to the chassis being in the raised position. In some embodiments, an integrated goggle helmet mount system includes: the goggle helmet mount; and a goggle bridge configured to attach to at least one goggle, wherein the chassis is integrally attached to the helmet block, and integrally attached to the goggle bridge, and wherein the electrical path extends from the chassis and at least partially through the goggle bridge. In some embodiments, the integrated goggle helmet mount system further includes a fore/aft piece that is integrally attached to the goggle bridge and to the chassis, wherein the chassis is linearly movable relative to the fore/aft piece.

According to an aspect, the technology relates to a goggle helmet mount, including: a helmet block attachable to a helmet; a chassis including a battery pack case configured to house a battery, and rotatably coupled to the helmet block such that the chassis is rotatably positionable in a lowered position and in a raised position; an electrical path electrically coupled to the battery pack case; an electrical switch provided along the electrical path and positionable in an opened configuration, whereby the electrical path is broken at the electrical switch, and in a closed configuration, whereby the electrical path is unbroken across the electrical switch; a magnet configured to cause the electrical switch to be in the closed configuration in response to the chassis being in the lowered position, and to be in the opened configuration in response to the chassis being in the raised position.

In some embodiments, the goggle helmet mount, further includes a magnetic flux conductor configured to cause the electrical switch to be in one of the opened or closed configurations in response to receiving a magnetic flux through a first surface greater than a magnetic flux threshold, and to cause the electrical switch to be in the other one of the opened and closed configurations in response to receiving a magnetic flux through the first surface below the magnetic flux threshold. In some embodiments, the magnet is fixedly positioned relative to the helmet block. In some embodiments, the chassis includes first and second arms extending substantially in an anterior direction, and the battery pack case is positioned between the first and second arms of the chassis. In some embodiments, the electrical path is at least partially electrically insulated from an exterior of the goggle helmet mount. In some embodiments, the chassis is attachable to a goggle bridge at an attachment region of the chassis, and the electrical path is electrically couplable between the battery pack case and the attachment region.

According to an aspect, the technology relates to a connection device for a goggle helmet mount system, including: a connection block, wherein a dove-tail socket is defined in the connection block at least in part by a primary surface and two sidewalls extending from opposite sides of the primary surface, and wherein protrusion opening is defined in one of the two sidewalls; and a steadying piece provided in the protrusion opening and configured to be in a relaxed state, whereby a protruding piece of the steadying piece protrudes from the protrusion opening into the dove-tail socket, and in a receded state, whereby the protruding piece of the steadying piece is at least partially pressed into the protruding opening in response to a force applied to the steadying piece from the dove-tail socket.

In some embodiments, the connection device further includes one or more springs positioned in the protrusion opening and coupled to the steadying piece to force the protruding piece of the steadying piece out from the protrusion opening and into the dove-tail socket in response to the steadying piece being in the relaxed state. In some embodiments, a goggle helmet mounting system, includes: a helmet mount attachable to a helmet; a goggle bridge attachable to at least one goggle; and the connection device, wherein the connection device is attached or attachable to one of the helmet mount or the goggle bridge, and the other one of the helmet mount or the goggle bridge includes a dovetail piece shaped and sized to be inserted into the dove-tail socket, and wherein the steadying piece is configured to be pressed into the receded state by the dovetail piece in response to the dovetail piece being inserted into the dovetail socket.

This summary is provided to introduce some features of non-limiting and non-exhaustive example embodiments, which are described in more detail with reference to the detailed description.

BRIEF DESCRIPTION OF THE DRAWINGS

The drawings form a part of this specification and depict non-limiting and non-exhaustive example embodiments of the present disclosure.

DETAILED DESCRIPTION

Figure 1:
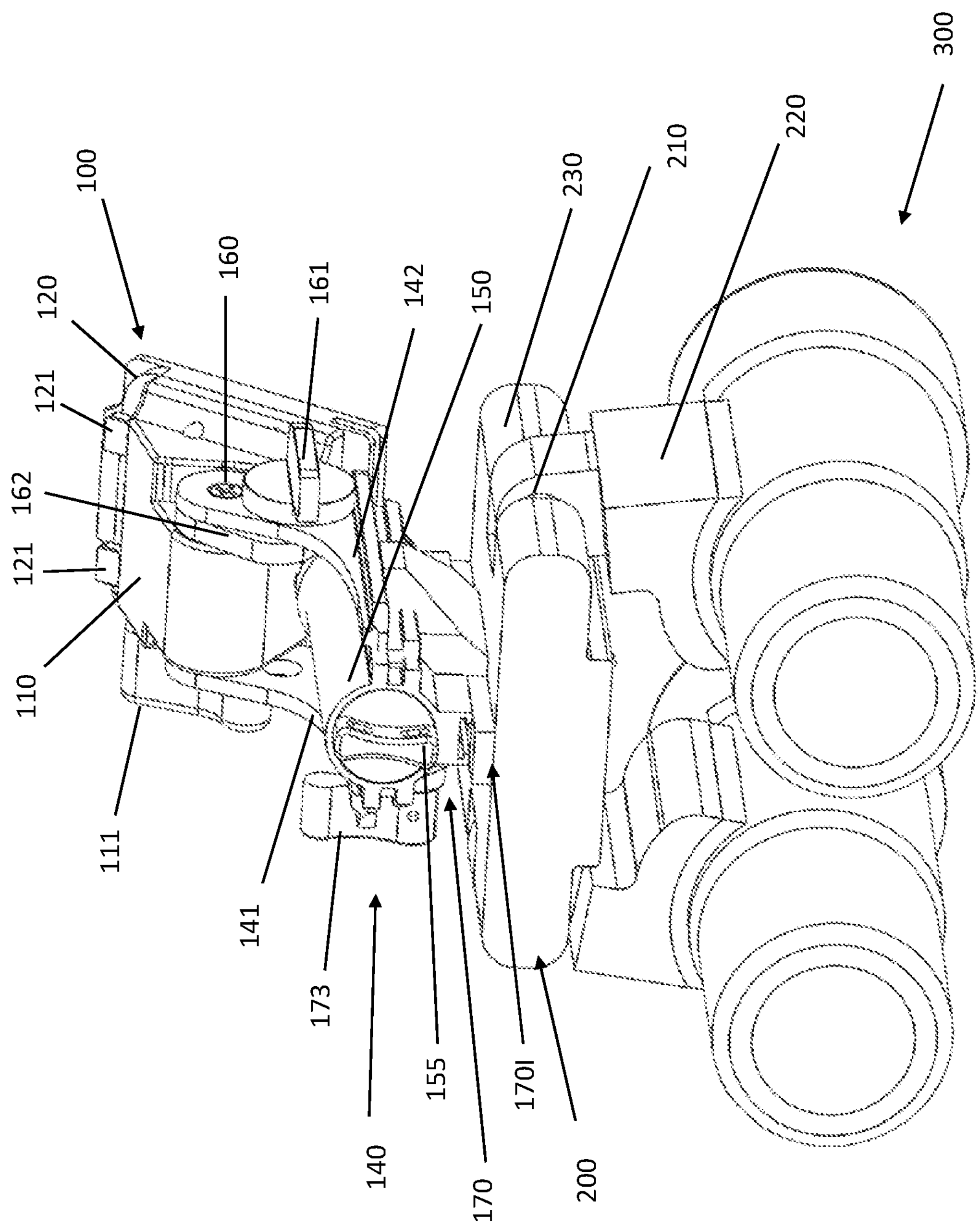
FIG. 1 depicts a perspective view of a helmet mount and goggle system according to an embodiment.
Figure 2:
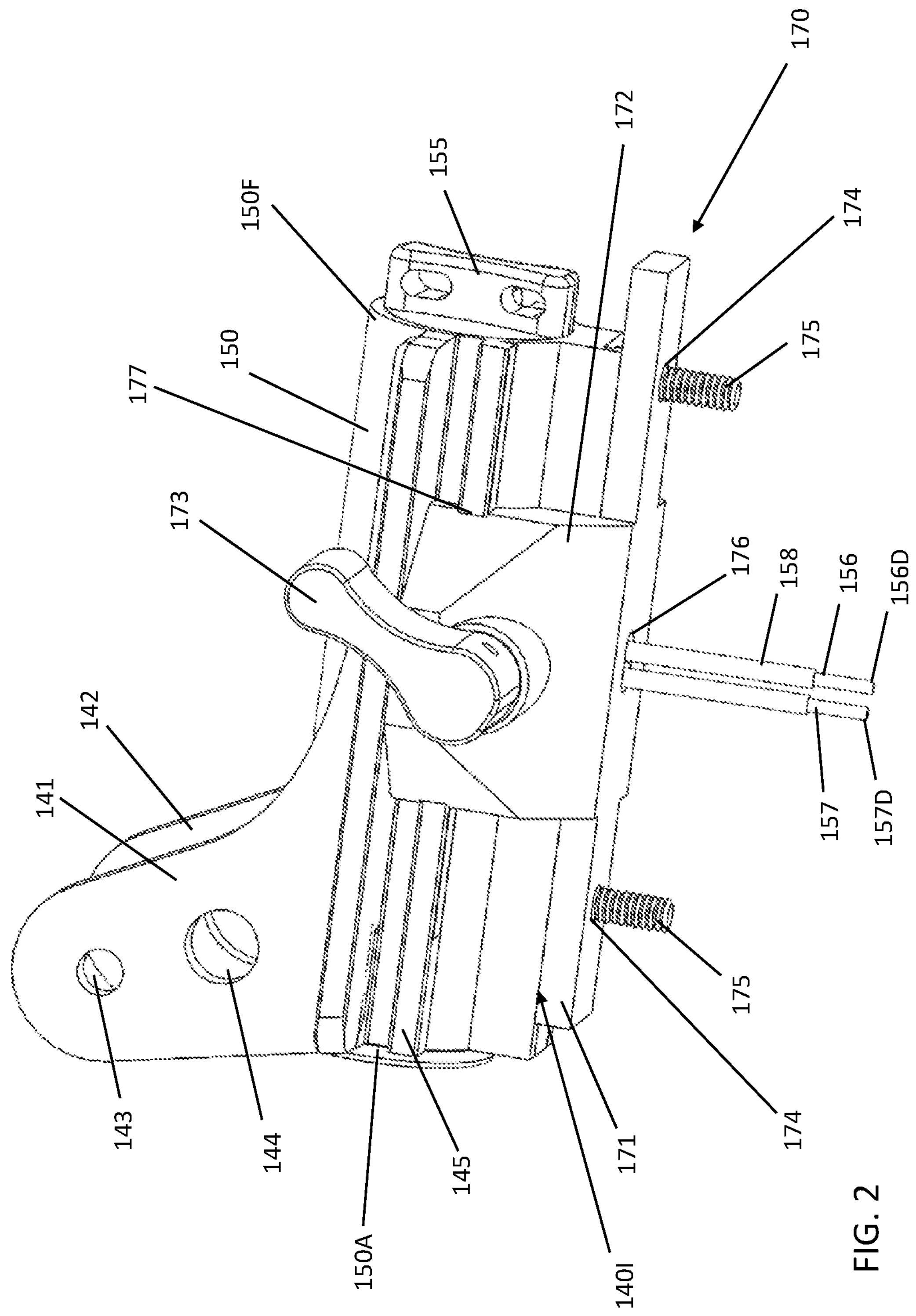
FIG. 2 depicts a perspective view of a chassis and fore/aft piece or carriage of FIG. 1.
Figure 3:
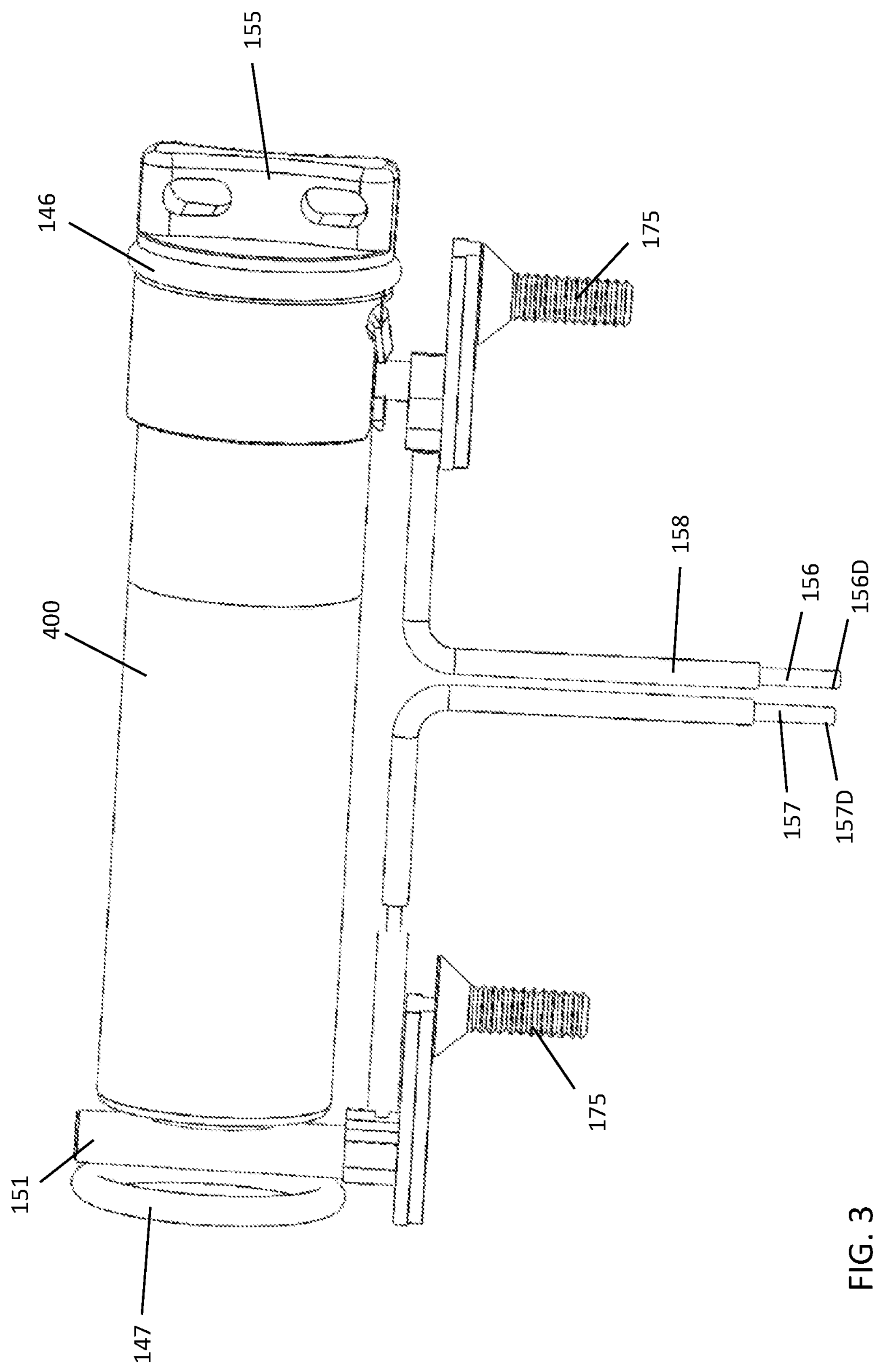
FIG. 3 depicts another perspective view of the chassis of FIG. 1, where part of the battery inside the battery pack case is illustrated for convenience.
Figure 4:
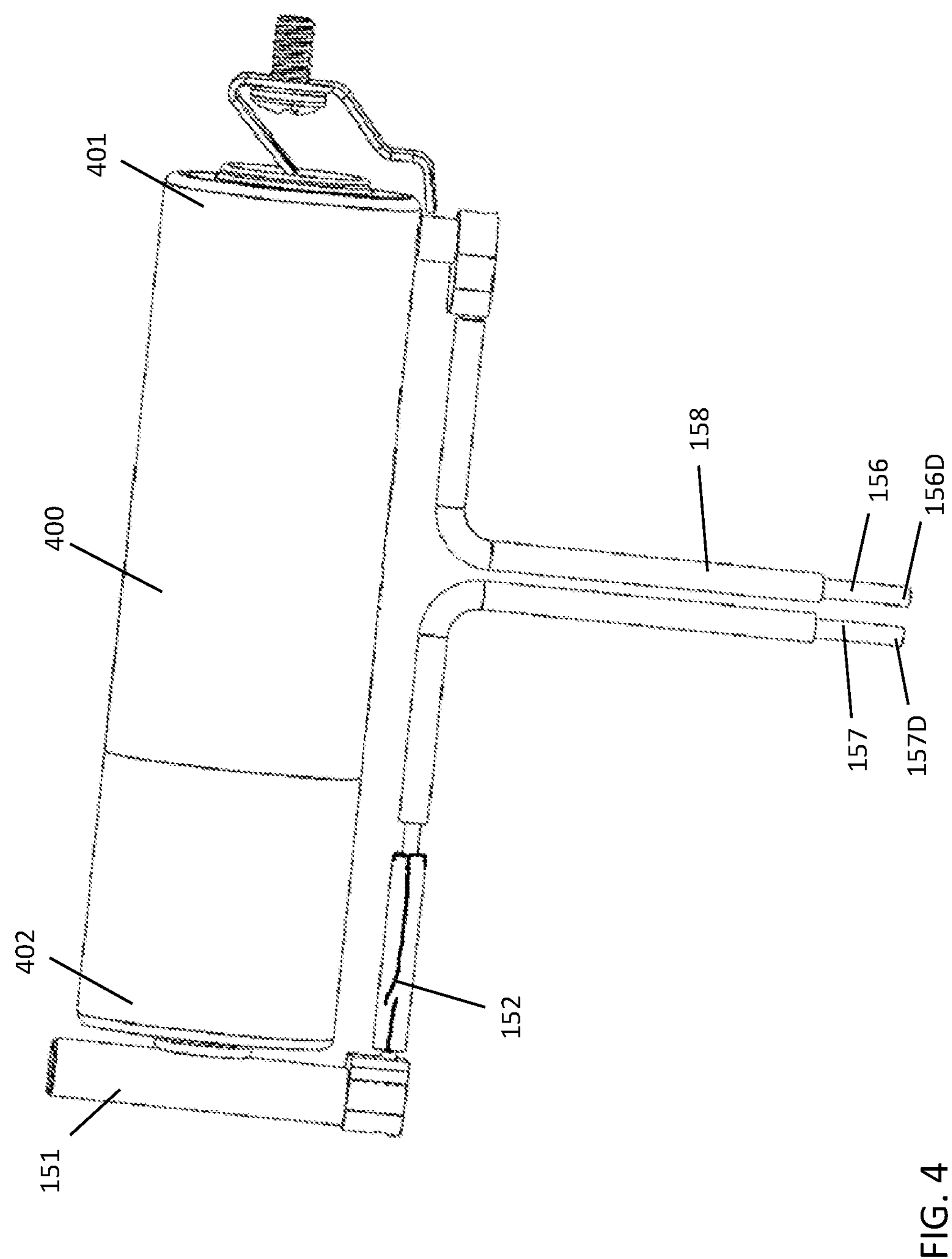
FIG. 4 depicts another perspective view of the chassis of FIG. 1, where the battery inside the battery pack case is illustrated for convenience.
Figure 5:
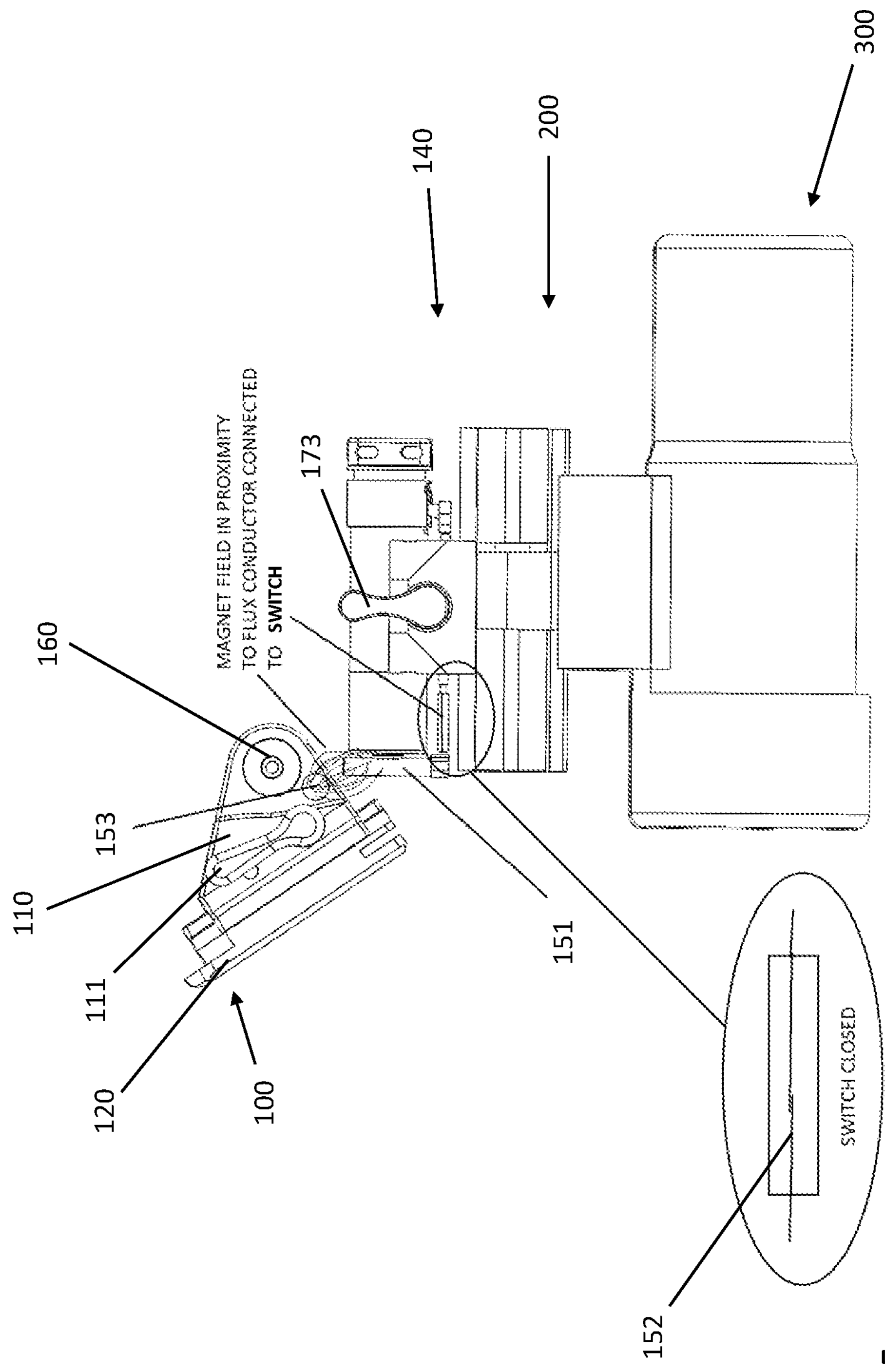
FIG. 5 depicts a side view of the helmet mount and goggles of FIG. 1 when the goggles are in an in-use position.
Figure 6:
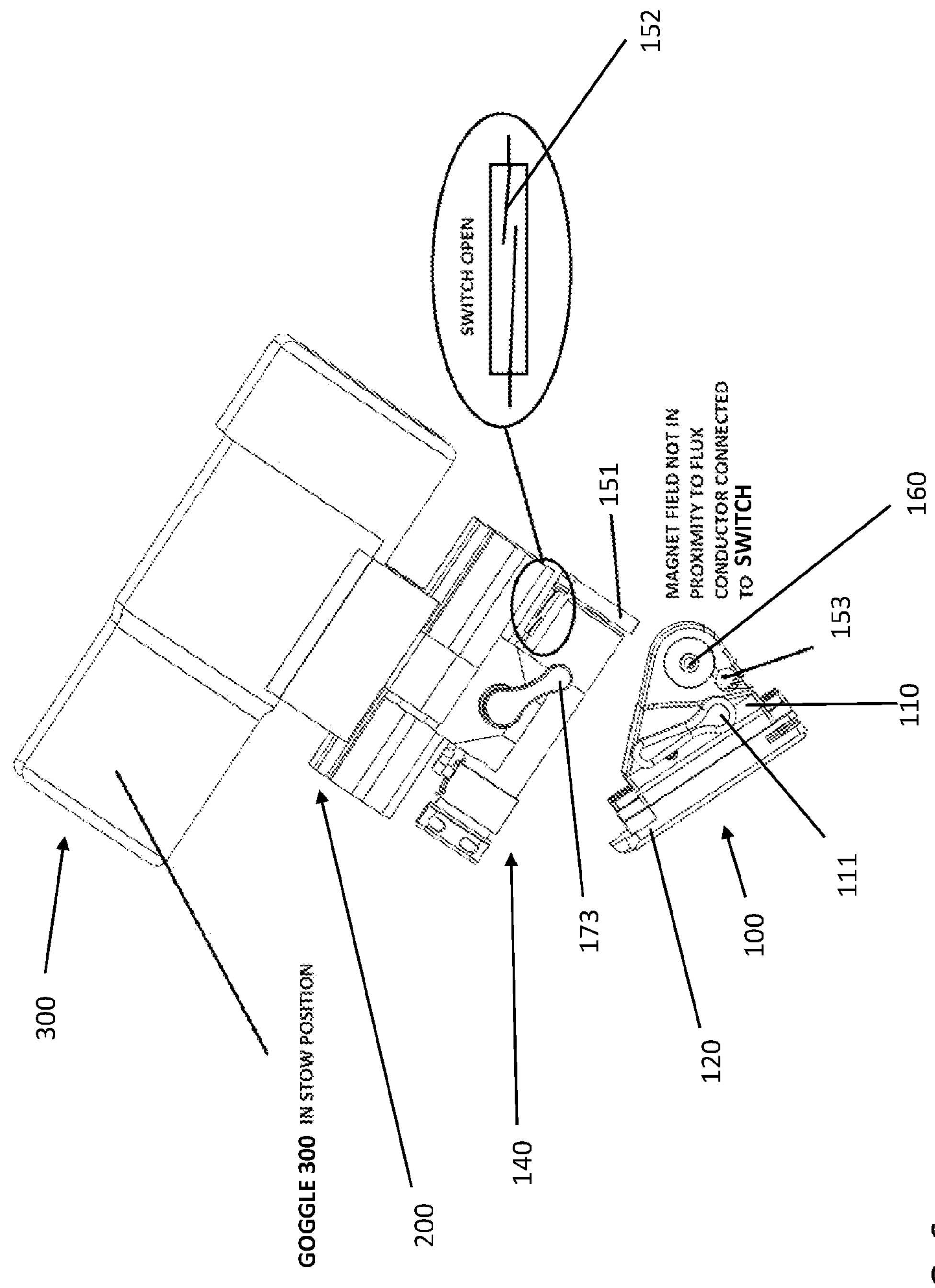
FIG. 6 depicts another side view of the helmet mount and goggles of FIG. 1 when the goggles are in a stowed position.
Figure 7:
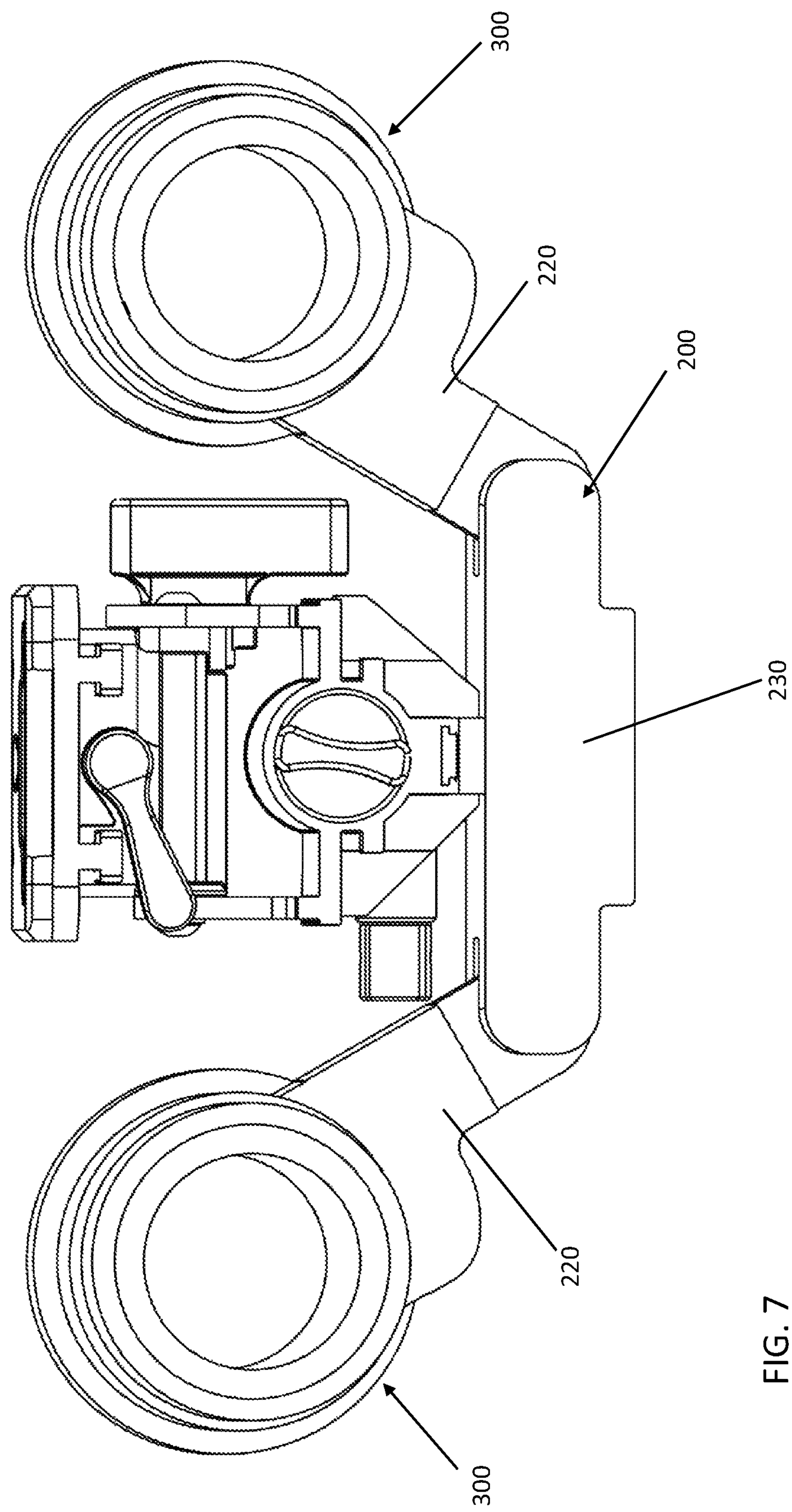
FIG. 7 depicts a front view of the helmet mount and goggles of FIG. 1 when the goggles are in a stowed position and also in an outwards configuration.
Figure 8:
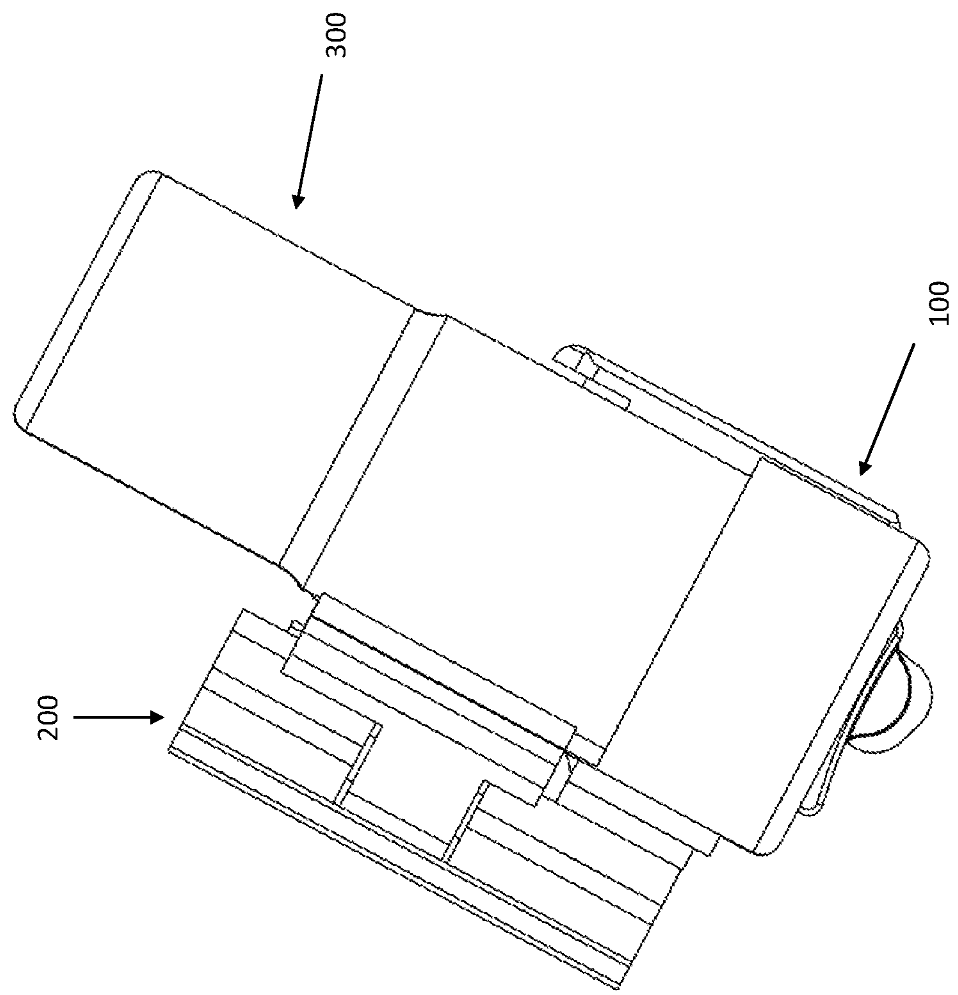
FIG. 8 depicts a side view of the helmet mount and goggles of FIG. 1 when the goggles are in an outward position and in a stowed position.

FIG. 1 depicts a perspective view of a helmet mount and binocular goggles according to an embodiment. FIG. 2 depicts a perspective view of a chassis and fore/aft piece or carriage of FIG. 1. FIG. 3 depicts another perspective view of the chassis of FIG. 1, where part of the battery inside the battery pack case is illustrated for convenience. FIG. 4 depicts another perspective view of the chassis of FIG. 1, where the battery inside the battery pack case is illustrated for convenience. FIG. 5 depicts a side view of the helmet mount and goggles of FIG. 1 when the goggles are in an in-use position. FIG. 6 depicts another side view of the helmet mount and goggles of FIG. 1 when the goggles are in a stowed position. FIG. 7 depicts a front view of the helmet mount and goggles of FIG. 1 when the goggles are in a stowed position and also in an outwards configuration. FIG. 8 depicts a side view of the helmet mount and goggles of FIG. 1 when the goggles are in an outward position and in a stowed position.

Referring to FIG. 1, a helmet mount 100 is illustrated, which may be attachable to a front (or anterior) part of a helmet (e.g., a part of a helmet configured to cover a person's forehead when worn) via a mounting plate 120. The helmet mount 100 may be attachable to a bridge 200, for example, via an intermediate connector 170. Binocular goggles 300 may be attachable to the bridge 200. The goggles 300 may be night vision goggles, but the present disclosure is not limited thereto.

The helmet mount 100 may include the mounting plate 120, a helmet block 110 vertically adjustable along the mounting plate 120, a chassis 140 pivotably coupled to the helmet block 110, and a battery pack case 150 incorporated in the chassis 140 between first and second chassis arms 141 and 142 of the chassis 140 and configured to house a battery 400 for providing power to the goggles 300.

The mounting plate 120 may be a metal or composite plate adapted to be mounted onto the helmet utilizing any fastening mechanism generally available. For example, the mounting plate 120 may be inserted into a receiving plate bolted onto the helmet.

The helmet block 110 may be slidingly engaged with the mounting plate 120 via one or more rails 121, which may extend parallel with each other and along a vertical direction. The helmet block 110 may therefore be vertically adjustable (or adjustable along a different direction) by a person wearing the helmet. A vertical adjust lever 111 may control whether the helmet block 110 can move along the rails 121. For example, the vertical adjust lever 111 can be in at least a locked configuration, whereby the position of the helmet block 110 along the rails 121 is fixed, and an unlocked configuration, whereby the helmet block 110 is movable along the rails 121. For example, the helmet block 110 may be configured with the vertical adjust lever 111 such that the helmet block 110 grips the rails 121 in response to the vertical adjust lever 111 moving from the unlocked configuration to the locked configuration so that the helmet block 110 is blocked by frictional forces from moving along the rails 121, and such that the helmet block 110 loosens its grip on the rails 121 in response to the vertical adjust lever 111 moving from the locked configuration to the unlocked configuration so that the helmet block 110 is movable along the rails 121. The vertical direction may generally correspond to a gravitational direction when the person wearing the helmet is standing upright. For example, the helmet block 110 may be positioned in at least a low position and in a high position along the rails 121, where the helmet block 110 is closer to the top of the user's head and farther from the user's eyes when it is in the high position compared to when it is in the low position.

The chassis 140 may include the first chassis arm 141 and the second chassis arm 142, and may be configured to be rotatable relative to the helmet block 110, for example, via a hinge 160. For example, the chassis 140 may be rotatably positionable in a lowered position (or in-use position), whereby the goggles 300 are positionable in front of a user's eyes, and in a raised position (or stowed position), whereby the goggles are positioned above the user's eyes and at least partially out of the user's field of view. The hinge 160 may include a shaft penetrating at least partially through the helmet block 110 and through at least one of the first chassis arm 141 or the second chassis arm 142. As shown in FIGS. 1 and 2, each of the first and second chassis arms 141 and 142 may have a shaft hole 143 shaped and sized to receive part of the shaft of the hinge 160. The shaft of the hinge 160 may be fixed to the helmet block 110 or to at least one of the first and second chassis arms 141 and 142 so that the chassis 140 can rotate relative to the helmet block 110. However, the present disclosure is not limited thereto, and the hinge 160 may be embodied in various different forms. The hinge 160 may be an infinitely adjustable hinge whereby the hinge 160 may be set at an infinite number of angular positions, or the hinge 160 may be an incrementally adjustable hinge whereby the hinge 160 may be set at a finite number of angular positions. In some examples, the hinge 160 may include a bearing/detent interface or a rotatable cam having features similar to the features described below with respect to arm hinges 210 of the bridge 200. A tilt of the chassis 140 may be controlled by a tilt adjuster 161. The tilt adjuster 161 may extend through a circular opening 144 in the second chassis arm 142 to interact or engage with an arcuate track or path in a tilt member 162, which may be a flat, tear-drop shaped piece positioned on the shaft forming at least part of the hinge 160 and between the helmet block 110 and the second chassis arm 142. The tilt adjuster 161 can be rotated in the circular opening to move along the arcuate path and thereby tilt the chassis 140 about the hinge 160.

The battery pack case 150 may be incorporated in the chassis 140, such as between the first and second chassis arms 141 and 142. In some embodiments, the battery pack case 150 may be an integrally formed part of the chassis 140. For example, the battery pack case 150 may be integrally formed with (e.g., be composed of a same material as) the first and second chassis arms 141 and 142. In a comparative example, the battery pack 150 is not placed between the first and second chassis arms 141 and 142, and the space between the first and second chassis arms 141 and 142 is unused, and thus, generally wasted, and the material occupying the space between the first and second chassis arms 141 and 142 increases the weight of the mounted system (e.g., the helmet mount, bridge, and goggles, collectively). In such a comparative example, the battery pack may be positioned lower down in the mounted system. For example, the battery pack may be coupled to a side of one of the goggles 300. By positioning the battery pack 150 between the first and second chassis arms 141 and 142 in some embodiments of the present disclosure, the mounted system becomes spatially more compact by utilizing the space between the first and second chassis arms 141 and 142 compared to the comparative example, the weight of the mounted system is reduced compared to the comparative example by utilizing the space between the first and second chassis arms 141 and 142 that would otherwise be occupied by structural material, and the torque applied to the helmet (and the user's head) is reduced compared to the comparative example by placing the battery and battery pack case higher up in the mounted system.

The battery pack case 150 may have an elongated shape extending along a lengthwise direction to accommodate a battery 400 having an elongated shape. The battery pack case 150 may be oriented between the first and second chassis arms 141 and 142 such that it extends lengthwise along a same direction as the first and second chassis arms 141 and 142 extend. For example, the lengthwise direction (or an elongation direction) of the battery pack case 150 may be substantially parallel to an extension direction of the first and second chassis arms 141 and 142. As used herein, the term "substantially parallel" may include being within 10 degrees, within 5 degrees, within 3 degrees, within 2 degrees, within 1 degree, or within 0.5 degrees from being exactly parallel. The lengthwise direction of the battery pack case 150 may refer to a direction along which a longitudinal axis of the battery pack case 150 extends. In some embodiments, the battery pack case 150 may be oriented to extend lengthwise (e.g., when the chassis 140 is in the lowered position) at least partly in an anterior direction (e.g., a fore-aft direction), or substantially in the anterior direction, for example, away from the helmet and/or from the helmet mount 100. As used herein, the term "substantially in an anterior direction" may include being within 10 degrees, within 5 degrees, within 3 degrees, within 2 degrees, within 1 degree, or within 0.5 degrees from being exactly in the anterior direction. By orienting the battery pack case 150 to extend at least partly in the anterior direction, a distance between the first and second arms 141 and 142 may be decreased, and the amount of material between the first and second arms 141 and 142 (and thus, the amount of material and weight of the goggle helmet mount system) may be reduced.

In some embodiments, the battery pack case 150 may extend lengthwise in a direction parallel, or substantially parallel, to an ocular axis of the goggle 300 (e.g., when the goggle 300 is attached to the bridge 200) and/or to the arm hinge 210 of the goggle 300. In some embodiments, the battery pack case 150 may be oriented to extend lengthwise in a direction perpendicular, or substantially perpendicular, to an axis of rotation of the chassis 140 relative to the helmet block 110. As used herein, the term "substantially perpendicular" may include being within 10 degrees, within 5 degrees, within 3 degrees, within 2 degrees, within 1 degree, or within 0.5 degrees from being exactly perpendicular. In some embodiments, the battery pack case 150 (e.g., a longitudinal axis of the battery pack case 150) is oriented to be in the sagittal plane (the plane dividing the left and right parts of the body of the human body) of a user when the helmet mount 100 is attached to the helmet and the helmet is worn by the user.

The battery pack case 150 may have a fore end 150F and an aft end 150A. The fore end 150F may be distal to the helmet and/or to the helmet block 110, and may correspond to a distal end of the first and second chassis arms 141 and 142. The aft end 150A may be proximal to the helmet and/or to the helmet block 110, and may correspond to a proximal end of the first and second chassis arms 141 and 142 where the first and second chassis arms 141 and 142 are coupled to, or extend from, the helmet block 110. The battery pack case 150 may extend lengthwise between the fore and aft ends 150F and 150A. For example, a longitudinal axis of the battery pack case 150 may extend between the fore and aft ends 150F and 150A.

The battery pack case 150 may include a cap 155 at the fore end 150F or at the aft end 150A to conceal and, when removed, expose an interior of the battery pack case 150 configured (e.g., shaped and sized) to house the battery 400. In the depicted example embodiment, the cap 155 is configured to couple to the fore end 150F to cover an opening of the interior of the battery pack case 150 at the fore end 150F, but the present disclosure is not limited thereto. In some embodiments, the cap 155 may be configured to couple to the aft end 150A to cover an opening of the interior of the battery pack case 150 at the aft end 150A. In yet some other embodiments, the battery pack case 150 may have two caps: one configured to couple to the fore end 150F and one configured to couple to the aft end 150A.

When the cap 155 is at the fore end 150F, the person may conveniently access the battery 400 (e.g., to replace the battery) when the goggles 300 are in an in-use position (see FIG. 5). The in-use position may refer to a position where the chassis 140 and goggles 300 are rotated relative to the helmet block 110 so that the goggles 300 are able to be in front of the person's eyes. The person can then remove the cap 155 and pull the battery 400 out of the battery pack case 150 or lean forward toward the ground to allow the battery 400 to slide out of the battery pack case 150 under the influence of gravity. In some other embodiments where the cap 155 is at the aft end 150A, the person may conveniently access the battery 400 when the goggles 300 are in a stowed position (see FIG. 6). The stowed position may refer to a position where the chassis 140 and goggles 300 are rotated relative to the helmet block 110 so that the goggles 300 are positioned upwards above the user's eyes. In the stowed position, the battery pack case 150 may be angled relative to a ground plane on which the person is standing with the aft end 150A closer to the ground than the fore end 150F is to the ground. The user could then remove the cap 155 to allow the battery 400 to slide out of the aft end 150A of the battery pack case 150 under the influence of gravity.

The helmet mount 100 (e.g., the chassis 140 and/or the battery pack 150) may include electrical connections configured to allow first and second terminals 401 and 402 of the battery 400 to be electrically coupled to the goggles 300 through the bridge 200. For example, the electrical connections in the helmet mount 100 may be provided in the interior of the battery pack case 150 and configured to electrically connect to the first and second terminals 401 and 402 when the battery 400 is secured within the interior of the battery pack case 150. The bridge 200 may include electrical connections configured to electrically couple between the electrical connections in the helmet mount 100 and the goggles 300. Therefore, one or more electrical paths may be provided from the battery 400 to the goggles 300 that extends through the chassis 140 and the bridge 200 to the goggles 300. The one or more electrical paths may be configured to allow power to be provided (e.g., to allow power to flow) from the battery 400 to the goggles 300.

The battery 400 includes the first terminal 401 and the second terminal 402. The first terminal 401 is a positive or negative terminal of the battery 400 that may be positioned at the fore end 150F of the battery pack case 150 when the battery 400 is inside the battery pack case 150. The second terminal 402 may be an opposite terminal to the first terminal 401 and may be positioned at the aft end 150A of the battery pack case 150 when the battery 400 is inside the battery pack case 150.

A first electrical connection 156 may provide an electrical path from the first terminal 401 to a distal end 156D of the first electrical connection 156 adapted to electrically contact a first electrical connection in the bridge 200 at a first electrical contact point. A second electrical connection 157 may provide an electrical path from the second terminal 402 to a distal end 157D of the second electrical connection 157 adapted to electrically contact a second electrical connection in the bridge 200 at a second electrical contact point. The first and second electrical connections in the bridge 200 may respectively provide electrical paths from the first and second electrical contact points to the goggles 300. Accordingly, in some examples, when the goggles 300 are powered on, an electrical current may flow from the first terminal 401 through the first electrical connection 156, then through the first electrical connection in the bridge 200, then through the goggle 300, then through the second electrical connection in the bridge 200, and then through the second electrical connection 157 to the second terminal 402. In some other embodiments, the electrical current may flow in the opposite direction. The binocular goggles 300 may be coupled in series or in parallel to the same battery. In some other examples, the battery pack case 150 is configured to house two batteries that are respectively to provide power to the two binocular goggles 300.

In the illustrated example embodiment, the first and second electrical connections 156 and 157 each include a wire at least partially insulated along the length of the wire and exposed at least at the distal ends 156D and 157D. In some embodiments, one or more electronic components, such as switches, transistors, capacitors, transformers and electrical chips (e.g., integrated circuits) may be provided along one or more of the electrical paths between the battery 400 and the goggles 300 in order to control various operations, such as operations of the goggles 300. At least some of the one or more electronic components may be provided in the bridge 200 or in the chassis 140.

When the chassis 140 is coupled to the bridge 200, the distal ends 156D and 157D of the first and second electrical connections 156 and 157 may respectively electrically contact the first and second electrical connections in the bridge 200. For example, the bridge 200 may have an electrical access opening shaped and sized to receive portions of the first and second electrical connections 156 and 157.

In some embodiments, the chassis 140 may be couplable to the bridge 200 via a fore/aft piece 170 that may function at least partially as an intermediate mounting piece, and the fore/aft piece 170 may have an electrical access hole 176 (see FIG. 2) adapted to allow the first and second electrical connections 156 and 157 to extend through the fore/aft piece 170 and to (e.g., into) the bridge 200. For example, the electrical access opening of the bridge 200 may overlap with the electrical access hole 176 of the fore/aft piece 170 when the fore/aft piece 170 is coupled to the bridge 200. In some other embodiments, the fore/aft piece 170 is an integral and fixed piece of the bridge 200, and the electrical access hole 176 forms part of the electrical access opening of the bridge 200. The fore/aft piece 170 will be described in more detail below.

The helmet mount 100 may be coupled to a main body 230 of the bridge 200, and each of the goggles 300 may be rotatably coupled to the main body 230 of the bridge 200 by a corresponding arm 220 of the bridge 200. The arm 220 may be pivotably coupled to the main body 230 by an arm hinge 210. When the arms 220 are pivotably coupled to the main body 230, a user may rotate the goggles 330 relative to the main body 230 between an inwards position and an outwards position (see FIG. 7, which illustrates the goggles 300 in an outwards position).

The arm hinge 210 may be an infinitely adjustable hinge that allows the arm 220 to be fixable at an infinite number of angular positions, or the arm hinge 210 may be an incrementally adjustable hinge that allows the arm 220 to be fixable at a finite number of angular positions.

In some embodiments, the arm hinge 210 may include a bearing/detent interface, wherein the bridge 200 has a first surface configured to interface with a second surface on the hinge 210. The first surface may have a plurality of detents and a low-friction cylindrical surface or bearing (e.g., ball bearing) affixed and projecting from the first surface along a central axis. The second surface on the hinge 210 may be configured to house one or more springs and one or more balls within one or more blind wells. The one or more balls may be sized such that they are configured to rest partially within a detent of the first surface. The springs may exert a force on the balls into the detents. The first and second surfaces therefore may form a bearing/detent interface, the hinge is rotatable about the central axis to a finite number of positions, and the hinge may be rotated between the positions by exerting a sufficient torque to overcome the frictional resistance provided between the balls and detents.

In some embodiments, the arm hinge 210 may include a rotatable cam assembly configured to be rotatable about a cam axis having a cylindrical shape and extending from the main body 230 at a first end of the shaft. The arm 220 may include a hinge joint having an opening configured (e.g., shaped and sized) to allow the hinge joint to be coupled to the cam axis and positioned along the cam axis. A cam may be provided at a second end of the cam axis with the hinge joint being between the first and second ends of the axis, and the cam may be configurable in at least a locked and unlocked configuration to respectively prevent and allow rotation of the hinge joint about the cam axis. When the cam is in the unlocked configuration, the hinge joint may be rotated about the cam axis by exerting a torque about or above a set torque value on the hinge joint to overcome frictional forces. The set torque value may be adjustable by various means generally available. In some embodiments, the frictional forces may be set so that the hinge will remain in place during use, but may be moved by an operator grasping the goggle tube attached to the hinge and applying sufficient force to overcome the frictional forces and rotate the hinge. Once moved, the hinge will then remain in place until moved again by the operator.

The first and second electrical connections in the bridge 200 may extend through the arms 220 to electrically couple to the goggles 300, for example, at where the goggles 300 are coupled to the arms 220. In some embodiments, the first and second electrical connections in the bridge 200 may include wires configured to accommodate rotation of the goggle 300 at the hinge 210. For example, the wires may undergo a bend at (e.g., in) the hinge 210 where, or near to where, the wire enters the arm 220, and the wire may be provided with sufficient length, space, and/or flexibility at the bend to allow a portion of the wire in the arm 220 to rotate relative to another portion of the wire in the main body 230 without the wire experiencing significant amounts of stress or strain at the bend. In some other embodiments, the first and second electrical connections in the bridge 200 do not extend through the arms 220, but rather, exit from an electrical exit opening of the main body 230 and extend from the electrical exit opening to the goggles 300 to electrically couple to the goggles 330.

The electrical paths electrically coupling the battery 400 to the goggles 300 may be entirely insulated so that the mounted system can be submerged in, or subjected to, water without the battery 400 or any part of the electrical paths being exposed to the water, which may cause the electrical paths to be short circuited. By insulating the electrical paths between the battery 400 and the goggles 300, a person may submerge himself or herself under water, or may be subjected to rain or snow, as may be useful in various situations, without damaging the functionality of the goggles 300. First and second O-rings 146 and 147 may be respectively provided at the fore and aft ends 150F and 150A of the battery pack case 150, where closeable openings to the battery pack case 150 may be provided. For example, the first O-ring 146 may improve the water seal of the battery pack case 150 where an opening to the battery pack case 150 is configured to be closed by the cap 155. The wires and other electrical components of the electrical paths may also be insulated. For example, wires forming part of the electrical paths may be at least partially insulated by an insulating layer 158, such as a dielectric or polymer coating. Portions of the electrical paths that are not directly coated with an electrically insulating layer may otherwise be sealed off from the outside environment. For example, a space where the distal ends 156D and 157D of the first and second electrical connections 156 and 157 are exposed may be sealed off from the outside environment, thereby maintaining the water seal of the electrical paths at the distal ends 156D and 157D where the first and second electrical connections 156 and 157 are respectively electrically coupled to the first and second electrical connections in the bridge 200. For example, an interface 1401 (see FIG. 2) between the chassis 140 and the fore/aft piece 170, and an interface 1701 (see FIG. 1) between the fore/aft piece 170 and the bridge 200, may each be water sealed in order to prevent or reduce water from penetrating into spaces provided by the electrical access hole 176, the electrical access opening in the bridge 200, and spaces fluidically coupled thereto.

The water seal of the interface 1401 may be provided, for example, by a sufficiently tight press between the chassis 140 and the fore/aft piece 170. Additionally or alternatively, the water seal of the interface 1401 may be provided by a sealing ring on a surface of the chassis 140 forming a part of the interface 1401 or on a surface of the fore/aft piece 170 forming another part of the interface 1401. The sealing ring may be a material, such as a polymer, configured to block the path of water. The sealing ring may be a closed sealing ring having a closed-line shape. As explained in more detail below, the bridge 200 and the fore/aft piece 170 may be movable relative to the chassis 140 to allow for adjustment of the position of the goggles 300 in a fore-aft direction. Therefore, the sealing ring may be fixedly attached to one surface of the surfaces of the chassis 140 and of the fore/aft piece 170 that form the interface 1401, and may be movable over the other surface of the surfaces of the chassis 140 and of the fore/aft piece 170 that form the interface 1401. The water seal of the interface 1701 may be provided in any manner that the water seal of the interface 1401 may be provided in. Because the fore/aft piece 170 may be fixed relative to the bridge 200, in some embodiments, a closed sealing ring provided at the interface 1701 may be fixedly attached to both of a surface of the fore/aft piece 170 forming part of the interface 1701 and a surface of the bridge 200 forming another part of the interface 1701.

At least one of the electrical paths between the first and second terminals 401 and 402 of the battery 400 and the goggle 300 may include an electrical switch 152 connected to a magnetic flux conductor 151. In some embodiments, the electrical switch 152 is any suitable type of reed switch. The electrical switch 152 may be configurable (e.g., positionable) in at least an opened configuration whereby the electrical path at the electrical switch 152 is broken (thereby preventing electrical current from flowing through the electrical switch 152) and a closed configuration whereby the electrical path at the electrical switch 152 is closed and unbroken across the electrical switch 152 (thereby allowing electrical current to flow through the electrical switch 152). The configuration of the electrical switch 152 may be influenced by an external magnetic field. In some embodiments, the electrical switch 152 may be configured such that it will be in one of the opened and closed configurations when magnetic flux through the flux conductor 151 (e.g., through a side or surface of the flux conductor 151) is above a threshold value, and such that it will be in the other one of the opened and closed configurations when the magnetic flux through the flux conductor 151 (e.g., through the side or surface of the flux conductor 151) is below the threshold value. In some embodiments, the flux conductor 151 is excluded. A magnet 153 (see FIGS. 5 and 6) may be provided and positioned on the helmet mount 100 (e.g., on the helmet block 110 or on the mounting plate 120) such that the electrical switch 152 is in the closed configuration when the chassis 140 is in the lowered position (e.g., when the goggles 300 are in the in-use position) and such that the electrical switch 152 is in the opened configuration when the chassis 140 is in the raised position (e.g., when the goggles 300 are in the stowed position). The magnet 153 may be fixedly attached to the helmet block 110, to the mounting plate 120, to the helmet, or to another portion of the helmet mount 100 rotatable relative to the chassis 140 about the hinge 160. For example, the magnet 153 may be fixedly positioned relative to the helmet block 110. In some embodiments, the helmet block 110 includes the magnet 153. For example, the magnet 153 may be positioned inside the helmet block 110.

In the depicted example embodiment, the magnet 153 is positioned on the helmet mount 100 such that, when the chassis 140 is in the lowered position (e.g., when the goggles 300 are in the in-use position), as shown in FIG. 5, the magnet 153 provides a magnetic flux through the flux conductor 151 above the threshold value so that the electrical switch 152 is in the closed configuration and power can be provided from the battery 400 to the goggles 300. When the chassis 140 is rotated to the raised position (e.g., when the goggles 300 are rotated about the rotation hinge 160 to the stowed position), as shown in FIG. 6, a distance between the magnet 153 and the flux conductor 151 may increase so that the magnetic flux through the flux conductor 151 provided by the magnet 153 is decreased below the threshold value. The electrical switch 152 may therefore be changed to the opened configuration so that power is unable to be provided from the battery 400 to the goggles 300, at least along the electrical path including the electrical switch 152. However, the present disclosure is not limited thereto, and other configurations of the magnet 153 and the electrical switch 152, wherein the goggles 300 are powered on when in the in-use position and powered off when in the stowed position, are included within the spirit and scope of the present disclosure. In some embodiments, the electrical switch 152 may be of a type or kind such that the electrical switch 152 is in the closed configuration in the absence of a magnetic field above a threshold strength, and is in the opened configuration when in the presence of a magnetic field above the threshold strength. In some other embodiments, the electrical switch 152 is of a type or kind such that the electrical switch is in the opened configuration in the absence of a magnetic field above a threshold strength, and is in the closed configuration when in the presence of a magnetic field above the threshold strength. Regardless of which type or kind the electrical switch 152 is, the magnet 153 may be positioned to cause (with or without the flux conductor 151) the electrical switch 152 to be in the closed configuration when the chassis 140 is in the lowered position, and to be in the opened configuration when the chassis 140 is in the raised position.

By fixedly positioning the magnet 153 on a portion of the helmet mount 100 (e.g., the helmet block 110 or the mounting plate 120) that is rotatable relative to the chassis 140 about the chassis hinge 160, power to the goggles 300 can be reliably provided when the goggles 300 are in the in-use position, and power to the goggles 300 can be reliably stopped when the goggles 300 are in the stowed position.

In contrast, in a comparison example, a magnet is provided on the chassis 140 or on another part of the helmet mount 100 that rotates with the chassis 140 about the chassis hinge 160. The magnet is slidingly engaged on a track such that its position on the track is influenced by gravity. The track may be oriented such that, when a person wearing the helmet stands upright and the goggles 300 are in the in-use position, the magnet may be pulled by gravity to a first position along the track where the magnet causes the electrical switch 152 to be in a closed position, thereby allowing power to be provided to the goggles 300. When the person stands upright and the goggles 300 are moved from the in-use position to the stowed position, the magnet may be pulled by gravity to a second position along the track where the magnet causes the electrical switch 152 to be in the opened position, thereby stopping power from being provided to the goggles 300. However, if the person moves from an upright position, as may be desirable under various situations, then the magnet may be pulled by gravity to an unintended position on the track. For example, the person may need to bend downward, lay on his or her back, or hang upside down from a tree, all of which may cause the magnet to be pulled to positions whereby the goggles are powered on when in the stowed position and powered off when in the in-use position. This may be inconvenient or detrimental to the person.

However, because the magnet 153 may have a fixed position on a portion of the helmet mount 100 rotatable relative to the chassis 140 about the chassis hinge 160 in some embodiments of the present disclosure, the interactions of the magnet 153 and the flux conductor 151 and electrical switch 152 are independent of gravitational forces, and thus, the goggles 300 can reliably be powered on when the goggles 300 are in the in-use position and reliably be powered off when the goggles 300 are in the stowed position.

The magnet 153 may include any material and have any shape, orientation, and configuration suitable to create a magnetic field that causes the electrical switch 152 to be closed when the chassis 140 is in the lowered position, (e.g., when the goggles 300 are in the in-use position) and opened when the chassis 140 is in the raised position (e.g., when the goggle 300 are in the stowed position). In some embodiments, the magnet 153 is a permanent magnet having a cylindrical shape and oriented such that a magnetic flux from the magnet 153 through the flux conductor 151 is above the threshold value when the goggles 300 are in the in-use position, and a magnetic flux from the magnet 153 through the flux conductor 151 is below the threshold value when the goggles 300 are in the stowed position. The permanent magnet may include any suitable ferromagnetic or ferrimagnetic material and may have any suitable strength (e.g., may generate a magnetic field having any suitable strength). In some embodiments, the permanent magnetic is capable of providing a magnetic field of 10-25 gauss. In some embodiments, the electrical switch 152 is any suitable type of reed switch configured to be in the closed position when the chassis 140 is in the lowered position (e.g., when the goggles 300 are in the in-use position) and to be in the opened position when the chassis 140 is in the raised position (e.g., when the goggles 300 are in the stowed position).

The fore/aft piece 170 may include a mounting piece 171, an attachment arm 172, and a fore/aft adjustment lever 173. The mounting piece 171 may be adapted to be coupled (e.g., mounted) to the bridge 200. For example, the mounting piece 171 may have one or more mounting access holes 174, each shaped and sized to receive at least part of a fastener 175 (e.g., screw-type fastener), and the mounting piece 171 may be coupled to the bridge 200 by the fasteners 175. The bridge 200 may have receiving holes to receive at least part of the fasteners 175. A bottom surface of the mounting piece 171 may form part of the interface 1701 between the fore/aft piece 170 and the bridge 200, and a top surface of the mounting piece 171 may form part of the interface 1401 between the fore/aft piece 170 and the chassis 140.

The attachment arm 172 may be fixedly attached to, and extend from, the mounting piece 171. The attachment arm 172 may be configured to slidingly engage with the chassis 140 to allow for adjustment of the fore/aft piece 170 and the bridge 200 relative to the chassis 140 along a fore-aft direction, such as along an anterior direction of the helmet. In some embodiments, the chassis 140 may include a T-rail 145 extending along the first chassis arm 141 in a lengthwise direction of the first chassis arm 141, and the attachment arm 172 may be configured to slidingly engage with the T-rail 145 via a groove 177 in the attachment arm 172. In some embodiments, the fore/aft piece 170 may additionally or alternatively include an attachment arm that is configured to slidingly engage with a T-rail extending along the second chassis arm 142 in a lengthwise direction of the second chassis arm 142.

The fore/aft adjustment lever 173 may control whether the attachment arm 172 is able to move relative to the chassis 140. For example, the fore/aft adjustment lever 173 may be configurable in at least a loosened configuration, whereby the attachment arm 172 is able to slide along the T-rail 145 and a tightened configuration, whereby the attachment arm 172 is fixed relative to the chassis 140. For example, the fore/aft adjustment lever 173 may cause the attachment arm 172 to tightly grip or clamp down on the T-rail 145 in the tightened configuration to prevent the attachment arm 172 from sliding along the T-rail 145, and the fore/aft adjustment lever 173 may loosen the grip of the attachment arm 172 on the T-rail 145 when the fore/aft adjustment lever 173 is changed from the tightened configuration to the loosened configuration to allow the attachment arm 172 to slide along the T-rail 145. However, the present disclosure is not limited thereto, and other configurations of the fore/aft piece 170 that allow the bridge 200 to be movable (e.g., slidable) relative to the chassis 140 along the fore-aft direction are included within the spirit and scope of the present disclosure.

The first and second electrical connections 156 and 157 may be flexible connections that allow for movement of the first and second electrical connections 156 and 157 within and relative to the chassis 140. The distal ends 156D and 157D of the first and second connections 156 and 157 (and portions of the first and second electrical connections 156 and 157 respectively adjacent to the distal ends 156D and 157D) may maintain fixed positions relative to the bridge 200 to avoid a break between the first and second electrical connections 156 and 157 and the first and second electrical connections in the bridge 200, respectively. For example, the distal ends 156D and 157D of the first and second electrical connections 156 and 157 may be substantially held in place relative to the fore/aft piece 170 and the bridge 200 by the electrical access hole 176, which may snuggly encircle portions of the first and second electrical connections 156 and 157.

The flexibility of the first and second electrical connections 156 and 157 allow the distal ends 156D and 157D of the first and second electrical connections 156 and 157 to move with the bridge 200 relative to the chassis 140 via the fore/aft piece 170. In some examples, the flexibility of the first and second electrical connections 156 and 157 may be provided by including wires that are loosely provided in the chassis 140 and sufficiently long to allow the wires to be pulled straight, condensed into a clump or coil, or in any configuration between being pulled straight (or straighter) and being condensed based on the position of the bridge 200 relative to the chassis 140. Accordingly, the bridge 200 and the goggles 300 may be adjustable in a fore-aft direction while reliably maintaining electrical connection between the battery 400 and the goggles 300. Flex cable may also be used to provide electrical connections and may be sufficiently looped to allow for the bridge 200 movement relative to the chassis 140.

Figure 9:
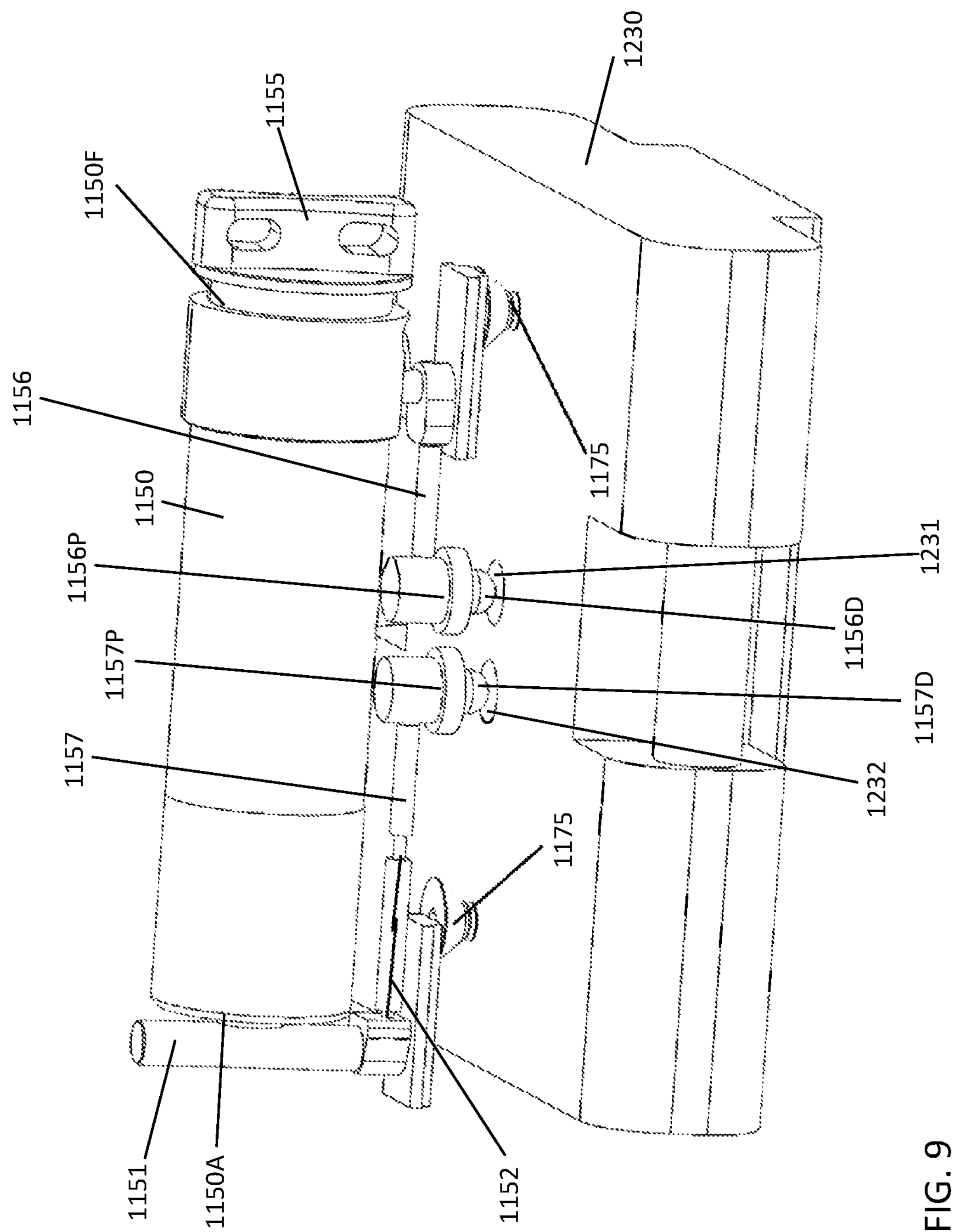
FIG. 9 depicts part of a chassis of a helmet mount and a bridge according to another embodiment.

FIG. 9 depicts part of a chassis of a helmet mount and a bridge according to another embodiment. Referring to FIG. 9, a helmet mount, a fore/aft piece, a bridge, and goggles may have similar features as described herein, and thus, differences may be primarily described and redundant descriptions may not be repeated.

The helmet mount of FIG. 9 may have a chassis incorporating a battery pack case 1150 having a fore end 1150F and an aft end 1150A, and including a cap 1155. The chassis may be couplable to a main body 1230 of a bridge via a fore/aft piece that is mounted to the bridge by one or more fasteners 1175. The chassis may include first and second electrical connections 1156 and 1157, an electrical switch 1152 along an electrical path provided by at least one of the first electrical connection 1156 or the second electrical connection 1157 (e.g., along the second electrical connection 1157, as shown in FIG. 9), and a flux conductor 1151 electrically connected to the electrical switch 1152. The first and second electrical connections 1156 and 1157 may respectively include compliant pogos 1156P and 1157P that are configured to transfer power from the helmet mount to the bridge. The compliant pogos 1156P and 1157P may be metal coated (e.g., coated with gold over nickel) and have rounded tips respectively forming distal ends 1156D and 1157D of the first and second electrical connections 1156 and 1157.

The bridge 200 may include first and second electrical contact pads 1231 and 1232 positioned, for example, on the main body 1230 of the bridge, to be contacted by the distal ends 1156D and 1157D of the first and second electrical connections 1156 and 1157 when the chassis is mounted onto the bridge. The first and second electrical contact pads 1231 and 1232 may include a metal or other conductive material. The rounded tips may be coupled to springs within the body of the compliant pogos 1156P and 1157P to allow the distal ends 1156D and 1157D to variably protrude from the body. The rounded tips may therefore extend from the bodies by a sufficient distance to respectively contact the electrical contact pads 1231 and 1232. Accordingly, a distance between the chassis and the bridge may be varied within a set range while allowing the first and second electrical connections 1156 and 1157 to contact the first and second electrical contact pads 1231 and 1232.

Portions of the compliant pogos 1156P and 1157P (e.g., portions of the bodies of the compliant pogos 1156P and 1157P) may extend through an electrical access hole of the fore/aft piece, and the compliant pogos 1156P and 1157P may therefore be moveable with the fore/aft piece and the bridge relative to the chassis.

Thus, in various embodiments as described above, the helmet mount, bridge and goggles may form one integral unit that is assembled together or formed as a unitary component. For example, in any helmet mount system described herein, the chassis may be integrally attached to the goggle bridge (with or without the fore/aft piece). As used herein, reference to one component being "integrally attached" to another component may refer to the one component being configured to be non-detachable from the other component during ordinary and intended use of the goggle helmet mount system including the two integrally attached components. For example, the one component may be bolted to, or screwed onto, the other component in a manner such that the one component is not configured to be detached from the other component during ordinary and intended use of the goggle helmet mount system that includes the integrally attached components. As another example, the one component may be welded, or adhesively attached, to the other component in a manner such that the one component generally cannot be detached from the other component. Integrally attached components may also be described as being "semi-permanently" attached because, although the components may be capable of being detached from each other through unintended means (e.g., by unbolting bolts that attach the one component to the other component, or by cutting through material), the components are not configured to be detached from each other during ordinary and intended use of the goggle helmet mount system. In some examples, in any goggle helmet mount system described herein, the chassis may be integrally attached to each of the helmet block and to the goggle bridge such that the helmet mount, the chassis, and the goggle bridge form an integral helmet mount system. In some embodiments, in any goggle helmet mount system described herein, the fore/aft piece is integrally attached between (e.g., to each of) the chassis and the goggle bridge such that the chassis is integrally attached to the goggle bridge via the fore/aft piece, and such that the helmet mount, the chassis, the fore/aft piece, and the goggle bridge form an integral helmet mount system.

Alternatively, in any helmet mount system described herein, various components of the goggle helmet mount system may be configured to be detachable one from another. For example, as described above, the helmet mount may be attachable to (and detachable from) the goggle bridge (and/or from the fore/aft piece), for example, through a releasable connector so that the two components are configured to be separated from one another when desired and during ordinary use of the helmet mount system. The releasable connector configuration can be one of a number of types known for use in making releasable connections.

Figure 10:
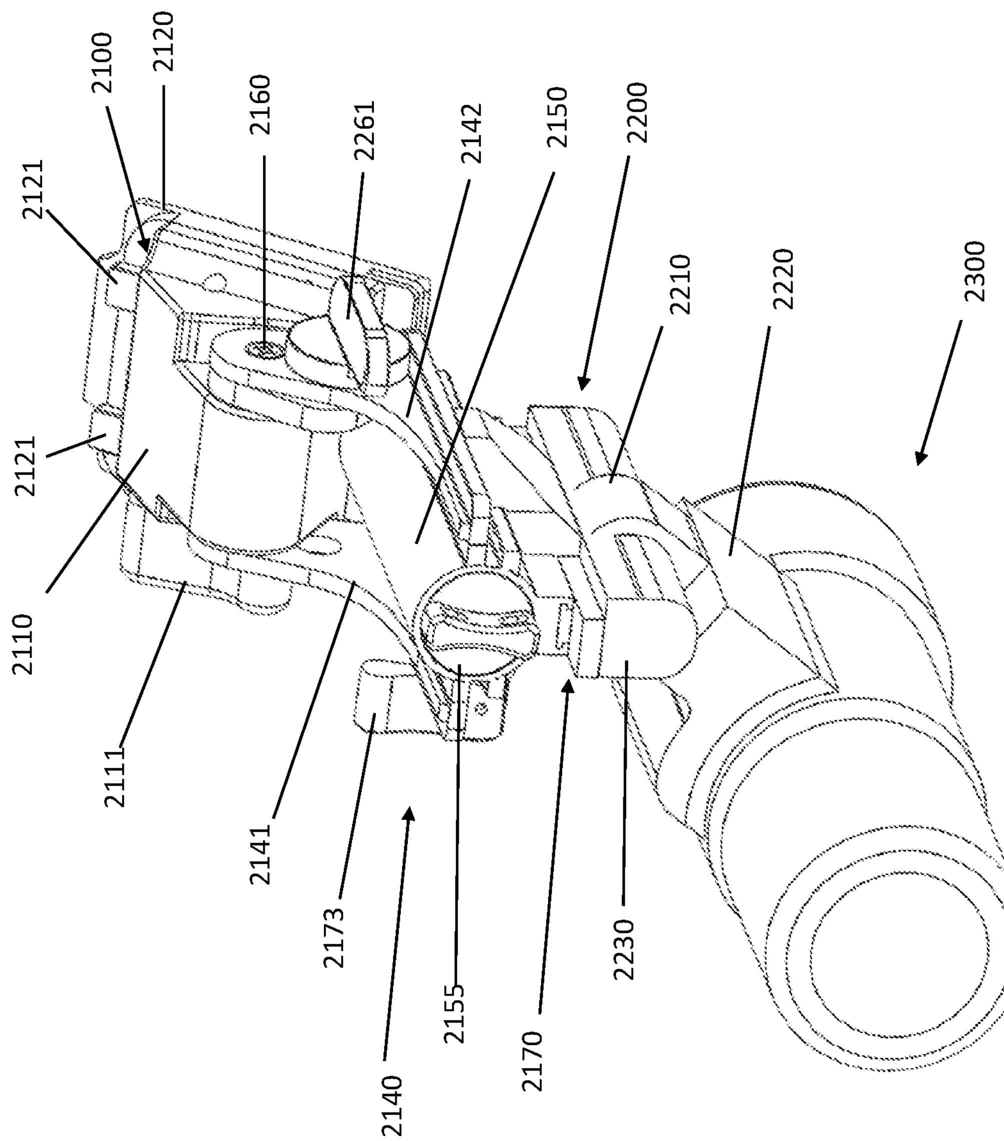
FIG. 10 depicts a perspective view of a helmet mount and monocular goggle according to an embodiment of the present disclosure.
Figure 11:
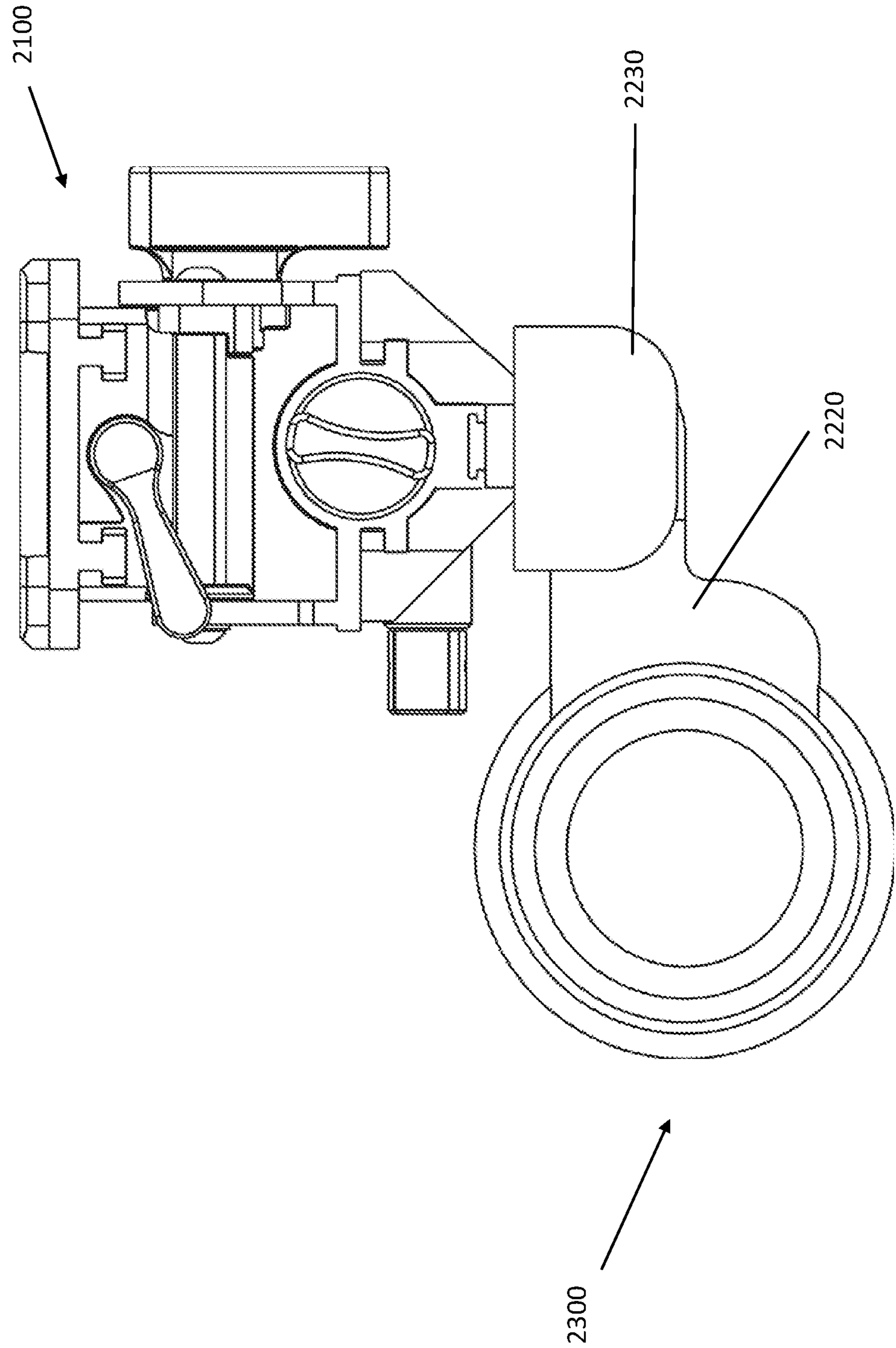
FIG. 11 depicts a front view of the helmet mount and the goggle of FIG. 10 when the goggle is in an outward position.

FIG. 10 depicts a perspective view of a helmet mount and monocular goggle according to an embodiment of the present disclosure. FIG. 11 depicts a front view of the helmet mount and the goggle of FIG. 10 when the goggle is in an outward position. Referring collectively to FIGS. 10 and 11, a helmet mount 2100, a fore/aft piece or carriage 2170, a bridge 2200, and the goggle 2300 may have similar features as illustrated and described herein with respect to FIGS. 1-9, and thus, differences may be primarily described and redundant descriptions may not be repeated. The helmet mount 2100 may include a mounting plate 2120 configured to be coupled to a helmet; a helmet block 2110 vertically translatable along the mounting plate 2120 via one or more rails 2121; a vertical adjust lever 2111; a chassis 2140 rotatably coupled to the helmet block 2110 via a chassis hinge 2160, including first and second arms 2141 and 2142, and incorporating a battery pack case 2150 between the first and second arms 2141 and 2142; a cap 2155 of the battery pack case 2150; and a tilt adjuster 2160 of the chassis 2140. The bridge 2200 may include a main body 2230 and an arm 2220 rotatably coupled to the main body 2230 by an arm hinge 2210. The goggle 2300 may be coupled to the bridge 2200 by the arm 2220 and may be rotatable with the chassis 2140 and about the chassis hinge 2160 between an in-use position and a stowed position. The goggle 2300 may be rotatable with the arm 2220 and about the arm hinge 2210 between an inward position (see FIG. 10), whereby the goggle 2300 may be viewed through by a person wearing the helmet when the goggle 2300 is in the in-use position, and an outward position (see FIG. 11), whereby the goggle 2300 is moved outward away from the person's view, even when the goggle 2300 is in the in-use position.

An electrical connection may be provided and configured to provide an electrical path between a battery in the battery pack case 2150 and the goggle 2300, and the electrical connection may have any features of the electrical connections and electrical paths illustrated and described herein with respect to FIGS. 1-9.

Figure 12:
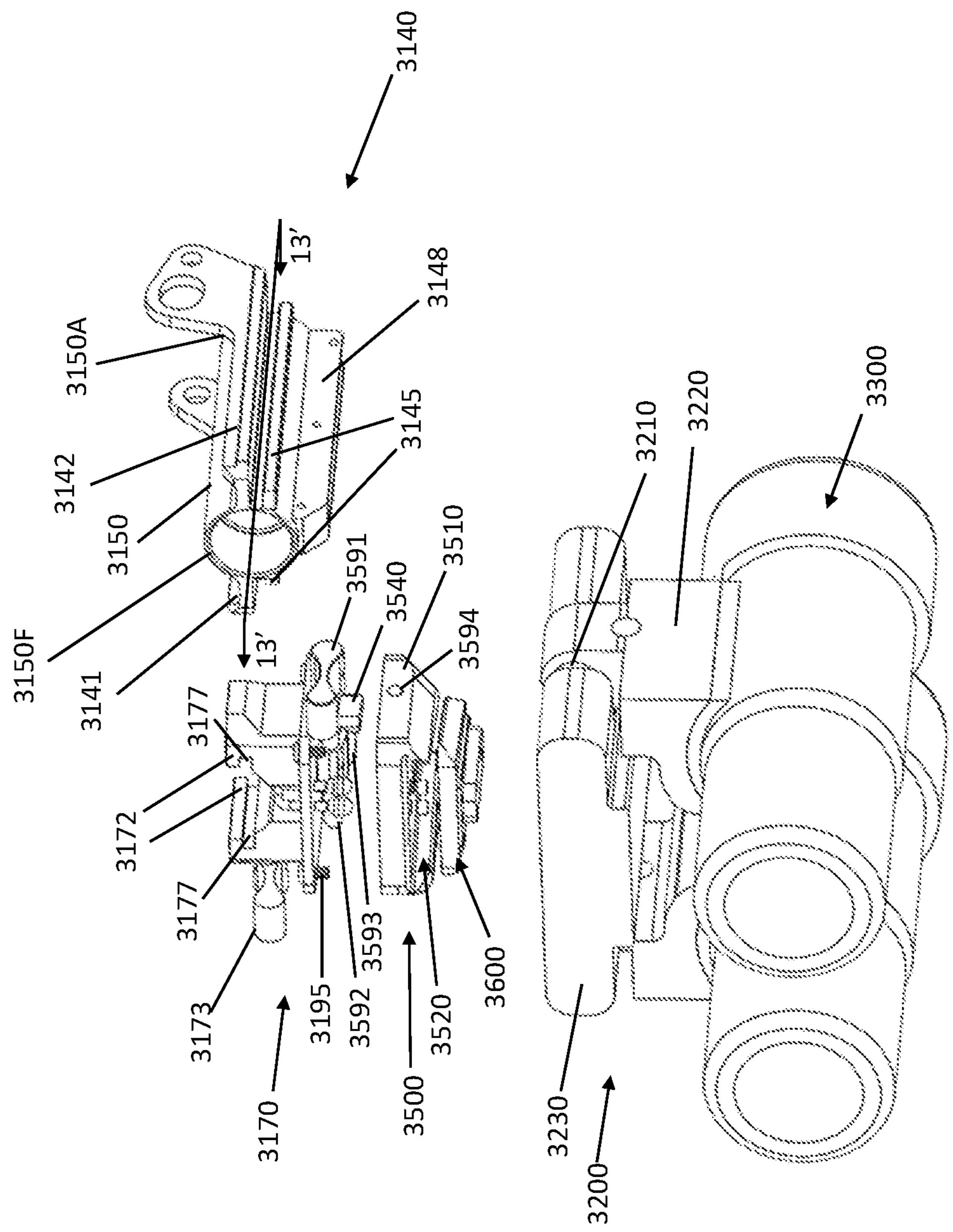
FIG. 12 depicts an exploded perspective view of a goggle helmet mount system according to an embodiment.
Figure 13:
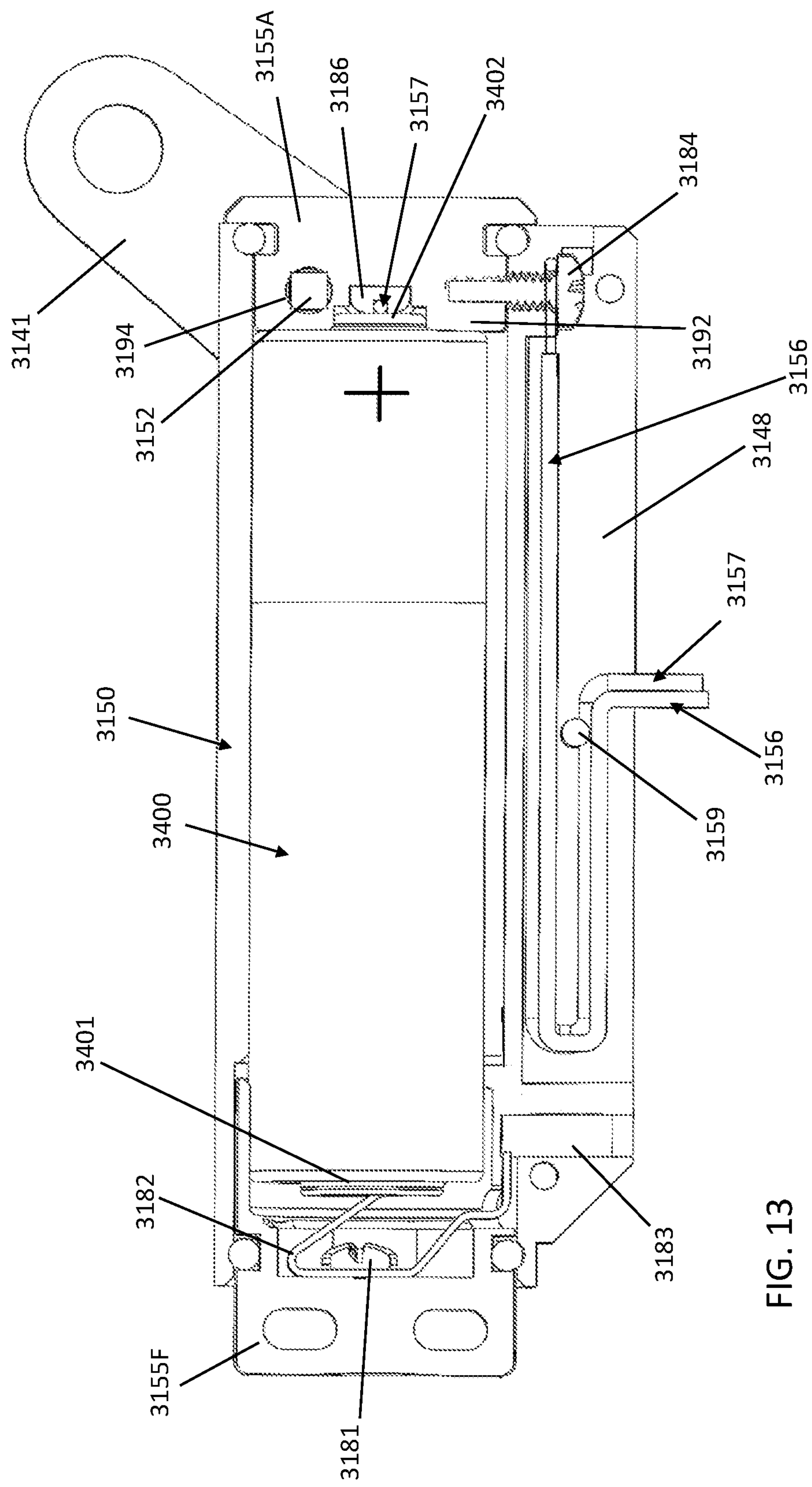
FIG. 13 depicts a cross-sectional view of the chassis of the helmet mount of the goggle helmet mount system of FIG. 12 along line 13'-13' in FIG. 12.
Figure 14:
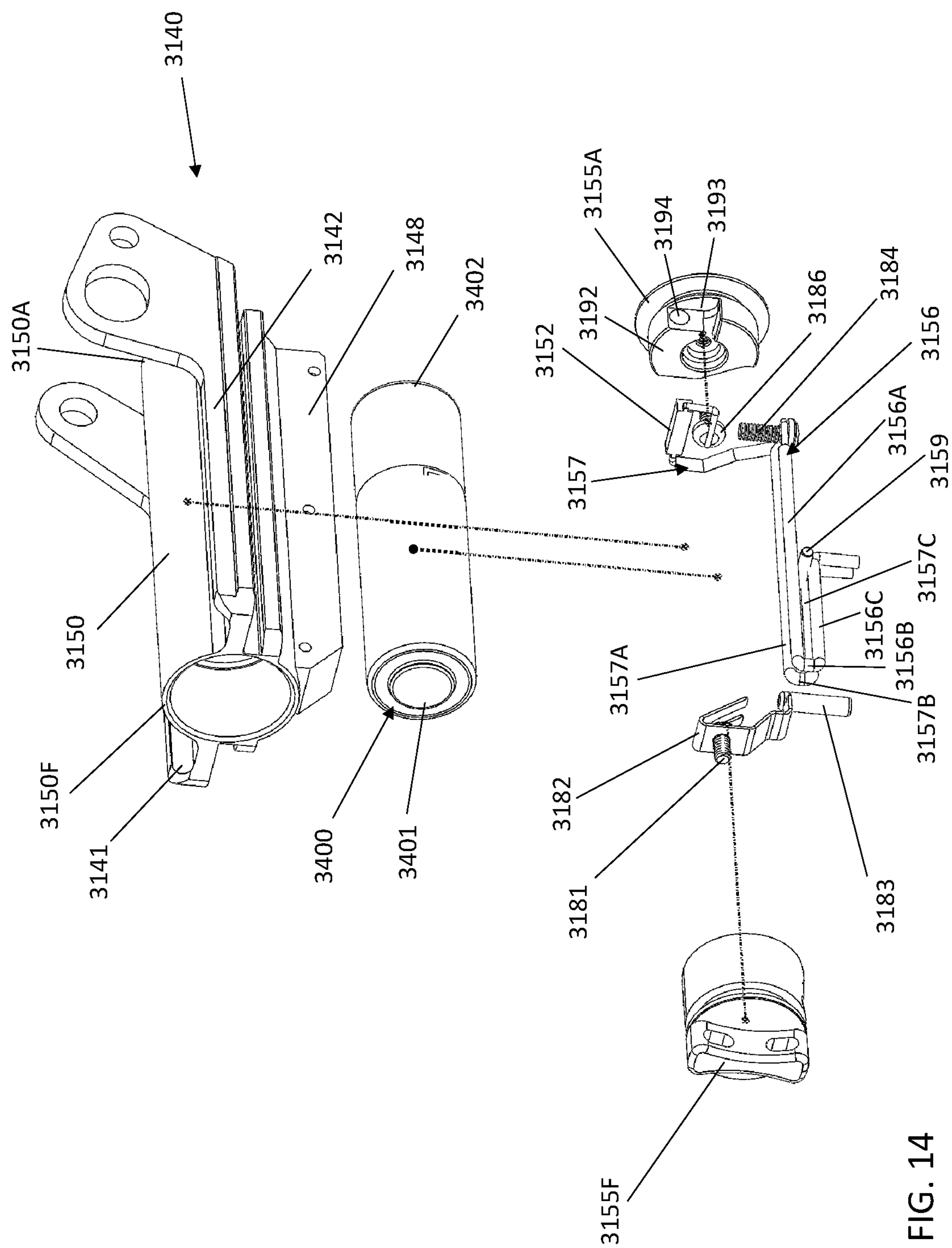
FIG. 14 depicts an exploded perspective view of some of the chassis of the helmet mount of FIG. 12.
Figure 15:
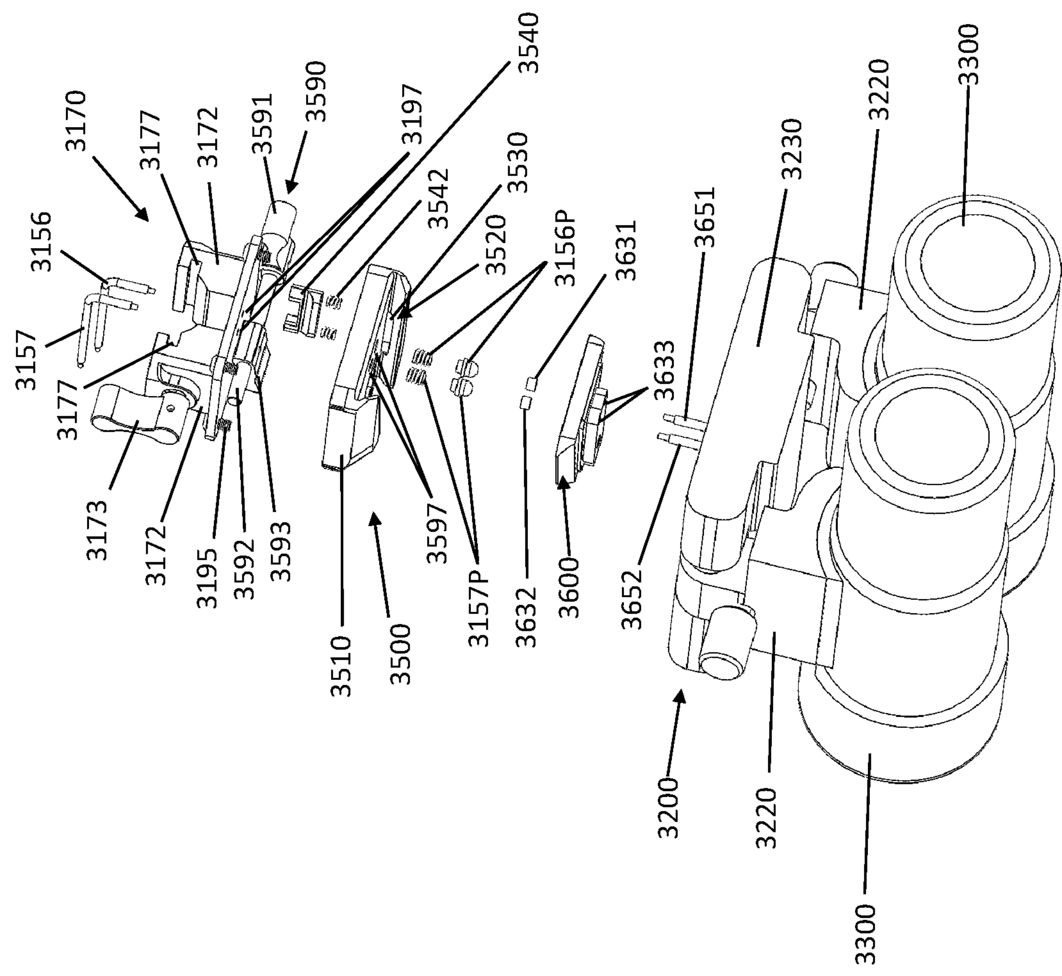
FIG. 15 depicts an exploded perspective view of part of the goggle helmet mount system of FIG. 12.
Figure 16:
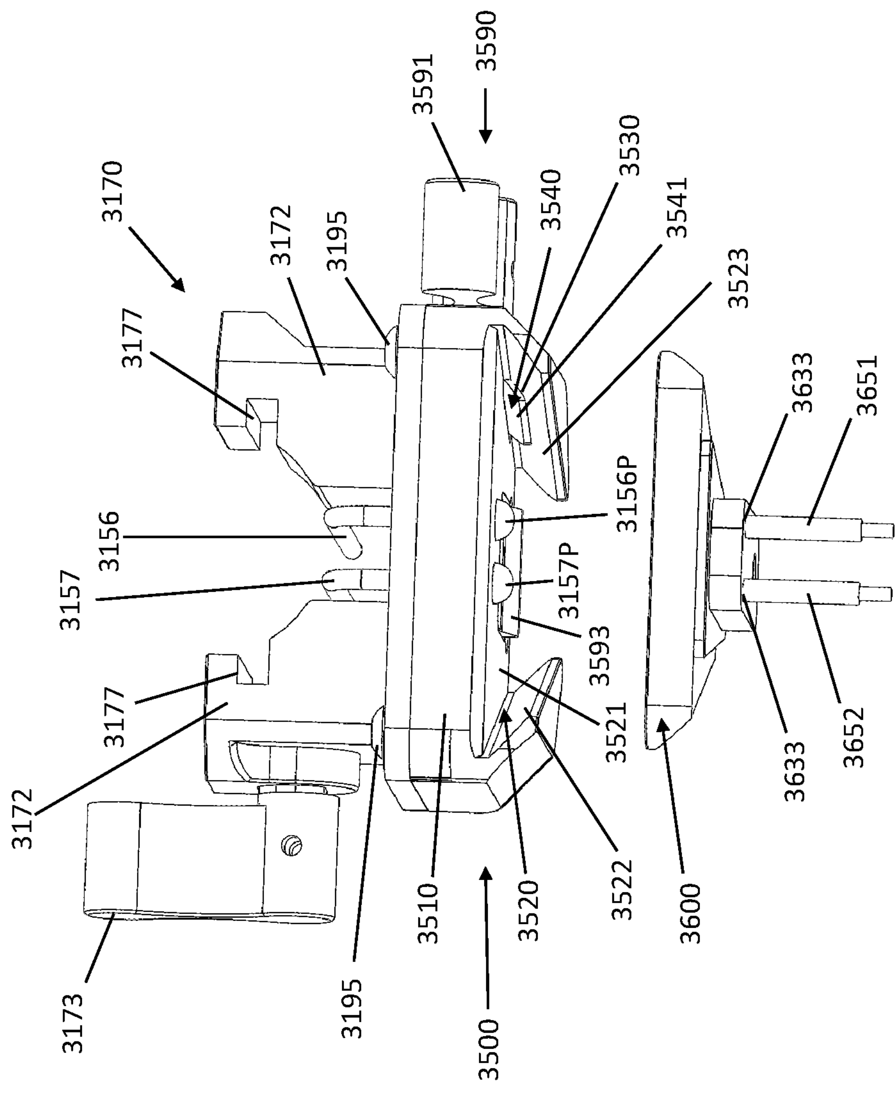
FIG. 16 depicts a frontal view of a fore/aft piece, a connection device, and a dovetail piece of the goggle helmet mount system of FIG. 12.
Figure 17:
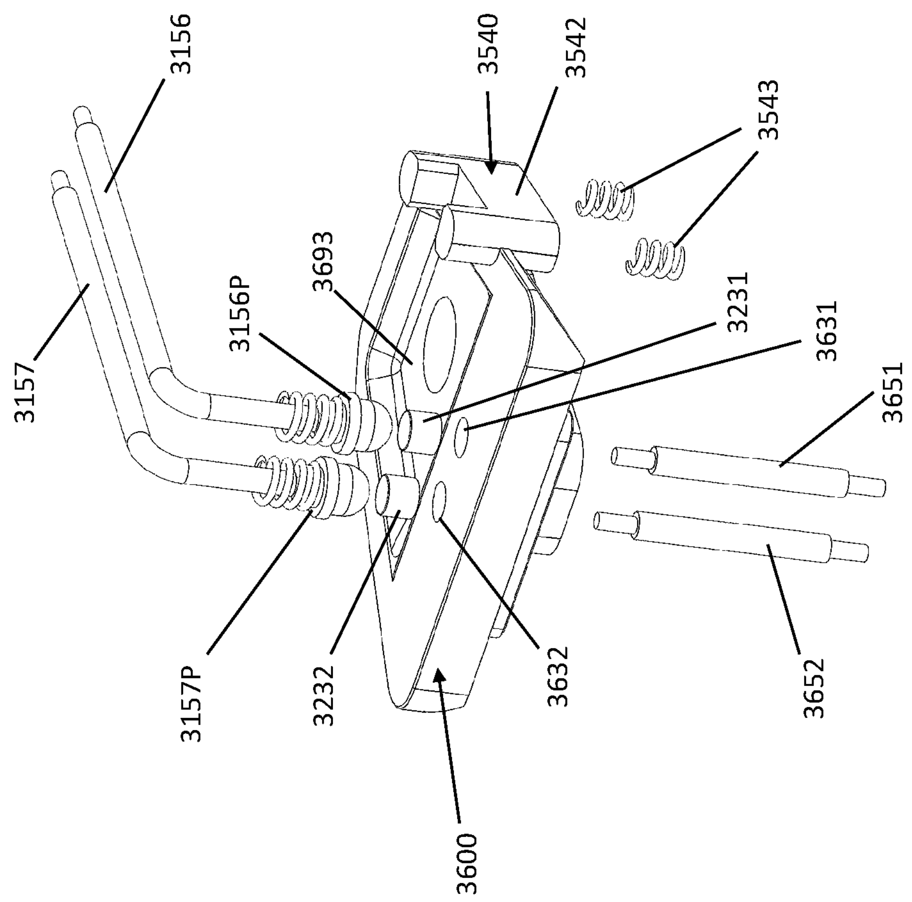
FIG. 17 shows a partially exploded view of part of the goggle helmet mount system of FIG. 12 when a steadying piece is engaged with the dovetail piece of the goggle helmet mount system.

FIG. 12 depicts an exploded perspective view of a goggle helmet mount system according to an embodiment. FIG. 13 depicts a cross-sectional view of the chassis of the helmet mount of the goggle helmet mount system of FIG. 12 along line 13'-13' in FIG. 12. FIG. 14 depicts an exploded perspective view of some of the chassis of the helmet mount of FIG. 12. FIG. 15 depicts an exploded perspective view of part of the goggle helmet mount system of FIG. 12. FIG. 16 depicts a frontal view of a fore/aft piece, a connection device, and a dovetail piece of the goggle helmet mount system of FIG. 12. FIG. 17 shows a partially exploded view of part of the goggle helmet mount system of FIG. 12 when a steadying piece is engaged with the dovetail piece of the helmet mount and goggle system. Referring collectively to FIGS. 12-17, a helmet mount, a fore/aft piece 3170, a goggle bridge 3200, and goggles 3300 may have some features similar to, or the same as, features of other helmet mount systems disclosed and illustrated herein, and thus, differences may be primarily described and redundant descriptions may not be repeated.

The helmet mount may include a helmet plate (not shown) attachable to a helmet (not shown), a helmet block (not shown) attached or attachable to the helmet plate, and a chassis 3140 coupled (e.g., rotatably coupled) to the helmet block as described herein. The helmet mount may include a magnet as described herein. The chassis 3140 may include first and second arms 3141 and 3142, a battery pack case 3150 having a fore end 3150F and an aft end 3150A, and at least one rail 3145 (e.g., two T-rails respectively on the first and second arms 3141 and 3142), as described herein. The battery pack case 3150 may include a cap at the fore end 3150F and/or a cap at the aft end 3150A to selectively conceal or expose an interior of the battery pack case 3150. In the depicted embodiment, the battery pack case 3150 includes a fore-end cap 3155F at the fore end 3150F of the battery pack case 3150, and an aft-end cap 3155A at the aft end 3150A of the battery pack case 3150. In some embodiments, the aft-end cap 3155A may be fixedly attached to the aft end 3150A, for example, by a second screw 3184, such that the aft-end cap 3155A is not configured to be detached from the battery pack case 3150 during ordinary use. In some other embodiments, the aft-end cap 3155A may be configured to be selectively attached to and detached from the battery pack case 3150. The chassis 3140 may be attachable to a goggle bridge 3200, and may include a lower portion 3148 positioned to be between the battery pack case 3150 and the goggle bridge 3200 when the chassis 3140 is attached to the goggle bridge 3200.

Referring to FIGS. 13-14, the chassis 3140 may include an electrical path including one or more electrical connections. The electrical path may include a first electrical path electrically coupled to the fore end 3150F of the battery pack case 3150 and configured to electrically couple to a first terminal 3401 of the battery 3400, and a second electrical path electrically coupled to the aft end 3150A of the battery pack case 3150 and configured to electrically couple to a second terminal 3402 of the battery 3400.

The first electrical path may include a flexible conductive component 3182 (e.g., a flexible metal piece) at the fore end 3150F. The flexible conductive component 3182 may be configured to contact the first terminal 3401 of the battery 3400 when the battery 3400 is secured within the battery pack case 3150 and the fore-end cap 3155F is coupled to the battery pack case 3150 at the fore end 3150F. The flexible conductive component 3182 may be attached to the fore-end cap 3155F via a first screw 3181. At least part of the flexible conductive component 3182 that is configured to be between the battery 3400 and the fore-end cap 3155F may have a bent shape that is configured for compression and expansion between the fore-end cap 3155F and the first terminal 3401 of the battery 3400. When the battery is in the battery pack case 3150, and the fore-end cap 3155F is secured into the battery pack case 3150, the fore-end cap 3155F may press the flexible conductive component 3182 against the first terminal 3401 of the battery 3400 such that the flexible conductive component 3182 is compressed. The compression of the flexible conductive component 3182 can accommodate some movement (e.g., jostling) of the battery 3400 within the battery pack case 3150 during ordinary use of the goggle helmet mount system without electrical connection between the first and second terminals 3401 and 3402 and the first and second electrical paths being broken.

The first electrical path may include a first wire 3156 having a first electrically exposed end at or near the aft end 3150A of the battery pack case 3150. The chassis 3400 may be composed of, or may include, a conductive material (e.g., a metal) that provides an electrical connection between the flexible conductive component 3182 and the first electrically exposed end of the first wire 3156, and which defines part of the first electrical path. For example, the chassis 3400 may be substantially composed of a metal material. In some embodiments, an exterior portion of the metal material of the chassis 3400 may be anodized to reduce the electrical conductivity of the exterior portion without substantially or intentionally reducing the electrical conductivity of an interior portion of the metal material, which may provide the electrical connection between the flexible conductive piece 3182 and the first electrically exposed end of the first wire 3156. In some other embodiments, the chassis 3140 may be substantially composed of an insulator material (e.g., a plastic), and may include an electrically conductive material (e.g., a strip of metal) configured (e.g., shaped and sized) to provide an electrical connection between the flexible conductive component 3182 and the first electrically exposed end of the first wire 3156. The second screw 3184 may be screwed into chassis 3140 at the aft end 3150A of the battery pack case 3150, and the first electrically exposed end of the first wire 3156 may be fixedly attached to the second screw 3184 (e.g., securely wrapped around the second screw 3184) to secure a position of the first electrically exposed end of the fire wire 3156.

In some embodiments, the chassis 3140 includes a pin 3183 that is configured to be contacted by the flexible conductive component 3182 when the fore-end cap 3155F is coupled to the battery pack case 3150, and which is in contact with the conductive material of the chassis 3140 that forms part of the first electrical path between the flexible conductive component 3182 and the first electrically exposed end of the first wire 3156. For example, a hole may be provided in the chassis 3140 (e.g., in the lower portion 3148 of the chassis 3140), and may be shaped and sized to receive part of the pin 3183. The pin 3183 may be securely fitted in the hole such that part of the pin 3183 protrudes out from the hole so that contact can be made between the flexible conductive component 3182 and the pin 3183. The pin 3183 may improve electrical connection between the flexible conductive component 3182 and the first electrically exposed end of the first wire 3156. The second screw 3184 may provide an electrical contact point that is electrically connected to the first electrically exposed end of the first wire 3156 to improve the electrical connection between the pin 3183 (or the flexible conductive component 3182) and the first electrically exposed end of the first wire 3156.

The first wire 3156 may be flexible and may include a first part 3156A that extends along a first direction substantially parallel to an elongated direction of the battery pack case 3150 between the fore end 3150F and the aft end 3150A (e.g., a direction that extends from the aft end 3150A toward the fore end 3150F of the battery pack case 3150), a second part 3156B extending from the first part 3156A and that bends backwards (e.g., that bends by about 180 degrees), and a third part 3156C that extends from the second part 3156B and that extends substantially along a second direction opposite to the first direction (e.g., a direction that extends from the fore end 3150F toward the aft end 3150A of the battery pack case 3150). The first, second, and third parts 3156A, 3156B, and 3156C of the first wire 3156 may be positioned in a compartment (e.g., cavity) in the lower portion 3148 of the chassis 3140. In some embodiments, the third part 3156C of the first wire 3156 is positioned to be between the first part 3156A of the first wire 3156 and the fore/aft piece 3170 when the chassis 3140 is attached to the fore/aft piece 3170.

The first wire 3156 may include a fourth part that extends from the third part 3156C and that is configured, when the chassis 3140 is attached to the fore/aft piece 3170, to bend towards the fore/aft piece 3170 and to extend at least partially through the fore/aft piece 3170 to make contact with an electrical connection in the goggle bridge 3200 (e.g., a first electrical connection pad 3631). Because the chassis 3140 may be linearly movable relative to the fore/aft piece 3170 while the fourth part of the first wire 3156 extends through an opening in the fore/aft piece 3170, the first, second, and third parts 3156A, 3156B, and 3156C of the first wire 3156 may provide an excess length of wire in the chassis 3140 that accommodates the movement of the chassis 3140 relative to the fore/aft piece 3170 without the fourth part of the first wire 3156 being broken or unduly strained. The chassis 3140 may include one or more pins 3159 (or beams) extending between the first and third parts 3156A and 3156C of the first wire 3156 to provide orderly movement of the first, second, and third parts 3156A, 3156B, and 3156C of the first wire 3156 while the chassis 3140 moves relative to the fore/aft piece 3170, and to avoid entanglement of the first wire 3156 with itself and/or with other wires (e.g., a second wire 3157 to be discussed below).

The second electrical path may include the second wire 3157, which may be electrically coupled to the aft end 3150A of the battery pack 3150 and may be configured to electrically couple to the second terminal 3402 of the battery 3400. A first end of the second wire 3157 may be electrically exposed and electrically coupled to the aft end 3150A of the battery pack 3150.

The chassis 3140 may include a third screw 3186 that couples the first electrically exposed end of the second wire 3157 to the aft-end cap 3155A. For example, a shaft of the third screw 3186 may extend into the aft-end cap 3155A, and a head of the third screw 3186 may be attached (e.g., via a solder bond) to the first electrically exposed end of the second wire 3157.

The aft-end cap 3155A of the battery pack case 3150 may have a generally donut-shaped protrusion 3192 that protrudes from the aft-end cap 3155A toward the fore end 3150F of the battery pack case 3150. The third screw 3186 may be screwed into the aft-end cap 3155A at a center of the done-shaped protrusion 3192. A cutout 3193 (e.g., an L-shaped cutout) may be formed in the donut-shaped protrusion 3192, and a channel 3194 (e.g., a cylindrically-shaped channel) may be defined through part of the donut-shaped protrusion 3192. The first electrically exposed end of the second wire 3157 may be positioned in the center of the donut-shaped protrusion 3192, and the second wire 3157 may extend along a curved path from the first electrically exposed end of the second wire 3157, along the space defining the cutout 3193, and through the channel 3194.

An electrical switch 3152 may be provided along the second wire 3157, and may be positionable in an opened configuration, whereby the second electrical path is broken at the electrical switch 3152, and in a closed configuration, whereby the second electrical path is unbroken or closed across the electrical switch 3152. The magnet may be provided (e.g., in the helmet mount, for example, in the helmet block) and positioned such that the magnet causes the electrical switch 3152 to be in the closed configuration when the chassis 3140 is in the lowered position, and to be in the opened configuration when the chassis 3140 is in the raised position. A flux conductor (operatively coupled to the electrical switch 3152 as disclosed herein) may be provided or excluded. In the illustrated example embodiment, a flux conductor is excluded. The electrical switch 3152 may be positioned at the aft end 3150A of the battery pack case 3150, for example, between the battery 3400 and the aft end 3150A (when the battery 3400 is secured within the battery pack case 3150). The electrical switch 3152 may generally extend along a direction perpendicular to the lengthwise or elongation direction of the battery pack case 3150. In some examples, the electrical switch 3152 may be at least partially positioned in the channel 3194. By positioning the electrical switch 3152 at the aft end 3150A of the battery pack case 3150, the electrical switch 3152 can be positioned closer to the magnet so that a flux conductor can be excluded in some embodiments, thereby reducing the complexity of, and the number of components needed for, the helmet mount.

The second wire 3157 may include a first part 3157A extending generally in the first direction, a second part 3157B extending from the first part 3157A and being bent backwards (e.g., bending through 180 degrees), and a third part 3157C extending from the second part 3157B and extending generally along the second direction. In some embodiments, the first, second, and third parts 3157A, 3157B, and 3157C of the second wire 3157 may have features similar to, or the same as, features of the first, second, and third parts 3156A, 3156B, and 3156C of the first wire 3156. For example, the one or more pins 3159 may also extend between the first and third parts 3157A and 3157C of the second wire 3157. In some examples, the first, second, and third parts 3156A, 3156B, and 3156C of the first wire 3156 may respectively be adjacent to the first, second, and third parts 3157A, 3157B, and 3157C of the second wire 3157 so that the first, second, and third parts 3156A, 3156B, and 3156C of the first wire 3156 respectively generally extend together with the first, second, and third parts 3157A, 3157B, and 3157C of the second wire 3157.

Referring to FIGS. 15-17, a connection device 3500 may be provided to connect components of a goggle helmet mount system, for example, to connect the chassis 3140 or the fore/aft piece 3170 to the goggle bridge 3200. The connection device 3500 may include a connection block 3510 configured to be attached to a first component of a goggle helmet mount system, and having a dovetail socket 3520 defined therein and configured to allow a second component of the goggle helmet mount system to be coupled to the first component via a dovetail piece 3600 that is shaped and sized to securely fit into the dovetail socket 3520 to connect the first and second components of the goggle helmet mount system. In some embodiments, the connection block 3510 is attached (e.g., integrally attached) or attachable to the fore/aft piece 3170, for example, by a plurality of screws 3195, and the dovetail piece 3600 is attached (e.g., integrally attached) or attachable to the goggle bridge 3200. In some other embodiments, the connection block 3510 is attached or configured to attach to the chassis 3140, for example, in some embodiments where the fore/aft piece 3170 is excluded. In some other embodiments, the connection block 3510 is attached (e.g., integrally attached) or attachable to the goggle bridge 3200, and the dovetail piece 3600 is attached (e.g., integrally attached) or attachable to the fore/aft piece 3170 (or to the chassis 3140).

Referring to FIG. 16, the dovetail socket 3520 may be defined in one side (e.g., a bottom side) of the connection block 3510, and may be defined at least in part by a primary surface 3521, a first sidewall 3522 extending from a first side (e.g., a right side) of the primary surface 3521 and at an angle relative to the primary surface 3521, and a second sidewall 3523 extending from a second side (e.g., a left side) of the primary surface 3521 opposite to the first side and at an angle relative to the primary surface 3521 (e.g., substantially the same angle as the first sidewall 3522 makes to the primary surface 3521).

A protrusion opening 3530 may be defined in one of the first or second sidewalls 3522 or 3523 of the dovetail socket 3520. The protrusion opening 3530 may form part of a cavity defined in the connection block 3510. A steadying piece 3540 may be provided in the protrusion opening 3530 (e.g., in the cavity), and may include a main body 3542 and a protruding piece 3541 attached to the main body 3542. At least part of the protruding piece 3541 may be shaped and sized to extend through the protrusion opening 3530. The steadying piece 3540 may be configured to be in a relaxed state, whereby the protruding piece 3541 protrudes from the protrusion opening 3530 into the dovetail socket 3520, and in a receded state, whereby the protruding piece 3541 is at least partially pressed into the protrusion opening 3530 (e.g., into the cavity) in response to a force being applied to the protruding piece 3541 from the dovetail socket 3520 (e.g., a force applied to the protruding piece 3541 by the dovetail piece 3600 when the dovetail piece 3600 is slid into the dovetail socket 3520).

In some embodiments, the connection device 3500 includes one or more springs 3543 (e.g., two springs) positioned within the protrusion opening 3530 (e.g., in the cavity) and operatively coupled to the steadying piece 3540 (e.g., to the main body 3542 of the steadying piece 3540) to force (e.g., by pushing or pulling the steadying piece 3540) the protruding piece 3541 out from the protrusion opening 3530 and into the dovetail socket 3520 when the steadying piece 3540 is in the relaxed state.

When the dovetail piece 3600 is slid into the dovetail socket 3520, the dovetail piece 3600 can push the protruding piece 3541 at least partially into the protrusion opening 3530 such that the steadying piece 3540 is in the receded state and the one or more springs 3543 are in a compressed state (or, in some other embodiments, a stretched state). If the dovetail piece 3600 is smaller than the dovetail socket 3520 (e.g., due to manufacturing deviations of the dovetail piece 3600, wear and tear of the dovetail piece 3600 over time, or design differences between shapes and sizes of the dovetail piece 3600 and of the dovetail socket 3520), the steadying piece 3540 may push the dovetail piece 3600 against other walls (e.g., the primary surface 3521 and/or the first sidewall 3522) of the dovetail socket 3520 to securely fix the position of the dovetail piece 3600 in the dovetail socket 3520. In contrast, in a comparison embodiment that does not include the steadying piece 3540, the dovetail piece 3600 may move (e.g., jostle and/or rattle) around within the dovetail socket 3520 during ordinary use, which can cause eye fatigue for the user of the goggle and/or create unwanted noise that can distract a user or alert other individuals in the vicinity of the user to the presence of the user.

Although the steadying piece 3540 has been described as being positionable in the relaxed and receded positions via one or more springs 3543, the present disclosure is not limited thereto. The steadying piece 3540 may be positionable in the relaxed and receded positions via other devices or mechanisms. Additionally, although the connection device 3500 has been illustrated as having one steadying piece, the present disclosure is not limited thereto. For example, the connection device 3500 may include a plurality of steadying pieces, each being independently operable in any manner described herein with respect to the steadying piece 3540. In some embodiments, the connection device 3500 may include one or more steadying pieces in the first sidewall 3522, one or more steadying pieces in the primary surface 3521, and/or one or more steadying pieces in the second sidewall 3523.

The connection device 3500 may include a cam 3590 configured to controllably lock and release the dovetail piece 3600 in the dovetail socket 3520. The cam 3590 may include a rotatable shaft 3592 coupled to a lever 3591 at one end, and a locking block 3593 fixed to the shaft 3592 and rotatable with the shaft 3592. The rotatable shaft 3592 may extend at least partially through the connection block 3510 (e.g., through a channel 3594 in the connection block 3510) while the lever 3591 may be located at a side of the connection block 3510. The cam 3590 may be positionable in a relaxed position, whereby the rotatable shaft 3592 is positioned at a first angular position and the locking block 3593 protrudes at least partially into the dovetail socket 3520 (e.g., from a cavity formed in the primary surface 3521), and in a receded position, whereby the rotatable shaft 3592 is positioned at a second angular position, rotated from the first angular position, and the locking block 3593 is partially receded into the connection block 3510 (e.g., into the cavity in the primary surface 3521) in response to a force being applied to the locking block 3593 from the dovetail socket 3520 (e.g., in response to a force being applied to the locking block 3593 by the dovetail piece 3600 as the dovetail piece 3600 is slid into the dovetail socket 3520). The cam 3590 can also be moved from the relaxed position to the receded position by using the lever 3591 to rotate the shaft 3591 from the first angular position to the second angular position. The cam 3590 may be positioned in the relaxed position in the absence of a force applied to the locking block 3593 or to the lever 3591 in any suitable manner, for example, under the force of a spring.

An indent 3693 (or recess) may be defined in a surface 3690 of the dovetail piece 3600 (e.g., an upper surface of the dovetail piece 3600 configured to face the primary surface 3521 of the dovetail socket 3520 when the dovetail piece 3600 is fitted into the dovetail socket 3520) and may be shaped and sized to receive at least part of the locking block 3593. As the dovetail piece 3600 is slid through the dovetail socket 3520, the dovetail piece 3600 may push the locking block 3593 into the receded position until the indent 3693 is positioned under the locking block 3593, at which time the locking block 3593 can snap back into the relaxed position (or in a mid-way position between the relaxed and receded positions) and fill at least part of the indent 3693. The locking block 3593 may then block (e.g., due to the shape of the locking block 3593) the dovetail piece 3600 from being slid in an opposite direction out of the dovetail socket 3520. Accordingly, the dovetail piece 3600 can be securely locked in place in the dovetail socket 3520. The dovetail piece 3600 can be released by using the lever 3591 to move the cam 3590 into the receded position so that the locking block 3593 is lifted out from the indent 3693, and so that the dovetail piece 3600 can be slid out from the dovetail socket 3520.

The fore/aft piece 3170, the connection device 3500, and the dovetail piece 3600 may each have one or more openings to allow for electrical connections to extend therethrough. For example, the fore/aft piece 3170 may have two openings 3197 shaped and sized for the first and second wires 3156 and 3157 to extend therethrough. The connection block 3510 may have two openings 3597 configured to respectively align with the two openings 3197 of the fore/aft piece 3170, and shaped and sized to allow the first and second wires 3156 and 3157 and/or first and second electrical pogo pins 3156P and 3157P to respectively extend therethrough. The dovetail piece 3600 may include first and second electrical contact pads 3231 and 3232 respectively securely fitted into first and second openings 3631 and 3632 in the surface 3690 of the dovetail piece 3600. The first and second electrical contact pads 3231 and 3232 may be configured to respectively align with the two openings 3597 in the connection block 3510 such that the first and second electrical pogo pins 3156P and 3157P can respectively contact the first and second electrical contact pads 3231 and 3232. The dovetail piece 3600 may have two openings 3633 configured to respectively receive first and second electrical connections 3651 and 3652 of the goggle bridge 3200 such that the first and second electrical connections 3651 and 3652 can respectively electrically contact the first and second electrical contact pads 3631 and 3632.

Although example embodiments have been described with respect to the drawings, the present invention is not limited thereby. A person of ordinary skill in the art will recognize that various modifications and combinations of the example embodiments are within the spirit and scope of the present disclosure. The invention is defined by the appended claims and equivalents thereof.

What is claimed is:

1. A goggle helmet mount, comprising:

a helmet block attachable to a helmet;

a chassis comprising a battery pack case configured to house a battery, and being rotatably coupled to the helmet block such that the chassis is rotatably positionable in a lowered position and in a raised position, the battery pack case being elongated along an axis, and oriented such that the axis extends from an aft end of the battery pack case proximal to the helmet block toward a fore end of the battery pack case distal to the helmet block; and an electrical path electrically coupled to the battery pack case.

2. The goggle helmet mount of claim 1, wherein the battery pack case is an integrally formed part of the chassis.

3. The goggle helmet mount of claim 1, wherein the battery pack case is oriented such that the axis extends at least partly in an anterior direction.

4. The goggle helmet mount of claim 3, wherein the battery pack case is oriented such that the axis extends substantially entirely in the anterior direction in response to the chassis being in the lowered position.

5. The goggle helmet mount of claim 1, wherein the chassis comprises first and second arms extending from the helmet block, and the battery pack case is positioned between the first and second arms of the chassis.

6. The goggle helmet mount of claim 1, further comprising:

a magnet fixedly positioned relative to the helmet block; and an electrical switch provided along the electrical path and positionable in an opened configuration, whereby the electrical path is broken at the electrical switch, and in a closed configuration, whereby the electrical path is unbroken across the electrical switch.

7. The goggle helmet mount of claim 6, wherein the magnet is a permanent magnet, the helmet block comprises the magnet, and the magnet is positioned to cause the electrical switch to be in the closed configuration in response to the chassis being in the lowered position, and to be in the opened configuration in response to the chassis being in the raised position.

8. The goggle helmet mount of claim 1, wherein the chassis is configured to attach to a goggle bridge at an attachment region of the chassis, and the electrical path extends between the battery pack case and the attachment region of the chassis.

9. The goggle helmet mount of claim 1, wherein the electrical path comprises a first wire electrically coupled to a first terminal end of the battery pack case, and a second wire electrically coupled to a second terminal end of the battery pack case opposite to the first terminal end, wherein at least a part of the first wire defines a first path that sequentially extends in a first direction substantially parallel to an elongation direction of the battery pack case between the first and second terminal ends of the battery pack case, bends backwards, and extends in a second direction opposite to the first direction, and wherein at least part of the second wire defines a second path that sequentially extends in the first direction, bends backwards, and extends in the second direction.

10. The goggle helmet mount of claim 9, wherein the chassis is configured to attach to a fore/aft piece so that the chassis is linearly movable relative to the fore/aft piece along the first and second directions.

11. The goggle helmet mount of claim 1, wherein the electrical path comprises:

a first electrical connection defining a first part of the electrical path electrically coupled or couplable between a first terminal end of the battery pack case and a distal end of the first electrical connection; and a second electrical connection defining a second part of the electrical path electrically coupled or couplable between a second terminal end of the battery pack case and a distal end of the second electrical connection, and wherein:

the first and second electrical connections respectively comprise first and second wires that are electrically exposed at the distal ends of the first and second electrical connections; or the first and second electrical connections respectively comprise first and second electrical pogo pins at the distal ends of the first and second electrical connections.

12. An integrated goggle helmet mount system comprising:

the goggle helmet mount of claim 1; and a goggle bridge configured to attach to at least one goggle, wherein the chassis is integrally attached to the helmet block, and integrally attached to the goggle bridge, and wherein the electrical path extends from the chassis and through at least part of the goggle bridge.

13. The integrated goggle helmet mount system of claim 12, further comprising a fore/aft piece that is integrally attached to the chassis and to the goggle bridge, wherein the chassis is linearly movable relative to the fore/aft piece, and wherein the electrical path extends through the fore/aft piece.

14. The integrated goggle helmet mount system of claim 12, wherein the electrical path is configured to be coupled between, or couplable between, the battery pack case and a goggle attachment region of the goggle bridge where the goggle bridge is configured to attach to a goggle of the at least one goggle.

15. A goggle helmet mount, comprising:

a helmet block attachable to a helmet;

a chassis coupled to the helmet block, and comprising a battery pack case configured to house a battery, the battery pack case being elongated along an axis, and oriented such that the axis extends from an aft end of the battery pack case proximal to the helmet block toward a fore end of the battery pack case distal to the helmet block; and an electrical path electrically coupled to the battery pack case.

16. The goggle helmet mount of claim 15, wherein the battery pack case is oriented such that the axis extends substantially entirely in an anterior direction.

17. The goggle helmet mount of claim 15, wherein the chassis comprises first and second arms extending from the helmet block, and the battery pack case is positioned between the first and second arms of the chassis.

18. The goggle helmet mount of claim 15, wherein the chassis is rotatably coupled to the helmet block such that the chassis is rotatably positionable in a lowered position and in a raised position, and wherein the battery pack case is oriented such that the axis extends at least partly, or substantially entirely, in an anterior direction when the chassis is in the lowered position.

19. The goggle helmet mount of claim 18, further comprising an electrical switch provided along the electrical path and positionable in an opened configuration, whereby the electrical path is broken at the electrical switch, and in a closed configuration, whereby the electrical path is unbroken across the electrical switch, wherein the helmet block comprises a magnet positioned to cause the electrical switch to be in the closed configuration in response to the chassis being in the lowered position, and to be in the opened configuration in response to the chassis being in the raised position.

20. An integrated goggle helmet mount system comprising:

the goggle helmet mount of claim 15; and a goggle bridge configured to attach to at least one goggle, wherein the chassis is integrally attached to the helmet block, and integrally attached to the goggle bridge, and wherein the electrical path extends from the chassis and at least partially through the goggle bridge.

21. The integrated goggle helmet mount system of claim 20, further comprising a fore/aft piece that is integrally attached to the goggle bridge and to the chassis, wherein the chassis is linearly movable relative to the fore/aft piece.

22. A goggle helmet mount, comprising:

a helmet block attachable to a helmet;

a chassis comprising a battery pack case configured to house a battery, and rotatably coupled to the helmet block such that the chassis is rotatably positionable in a lowered position and in a raised position, the battery pack case being elongated along an axis, and oriented such that the axis extends from an aft end of the battery pack case proximal to the helmet block toward a fore end of the battery pack case distal to the helmet block;

an electrical path electrically coupled to the battery pack case;

an electrical switch provided along the electrical path and positionable in an opened configuration, whereby the electrical path is broken at the electrical switch, and in a closed configuration, whereby the electrical path is unbroken across the electrical switch; and a magnet configured to cause the electrical switch to be in the closed configuration in response to the chassis being in the lowered position, and to be in the opened configuration in response to the chassis being in the raised position.

23. The goggle helmet mount of claim 22, further comprising a magnetic flux conductor configured to cause the electrical switch to be in one of the opened or closed configurations in response to receiving a magnetic flux through a first surface greater than a magnetic flux threshold, and to cause the electrical switch to be in the other one of the opened or closed configurations in response to receiving a magnetic flux through the first surface below the magnetic flux threshold.

24. The goggle helmet mount of claim 22, wherein the magnet is fixedly positioned relative to the helmet block.

25. The goggle helmet mount of claim 22, wherein the chassis comprises first and second arms extending substantially in an anterior direction, and the battery pack case is positioned between the first and second arms of the chassis.

26. The goggle helmet mount of claim 22, wherein the electrical path is at least partially electrically insulated from an exterior of the goggle helmet mount.

27. The goggle helmet mount of claim 22, wherein the chassis is attachable to a goggle bridge at an attachment region of the chassis, and the electrical path is electrically couplable between the battery pack case and the attachment region.

28. A goggle helmet mounting system, comprising:

a helmet mount attachable to a helmet;

a goggle bridge attachable to at least one goggle; and a connection device, the connection device comprising:

a connection block, wherein a dovetail socket is defined in the connection block at least in part by a primary surface and two sidewalls extending from opposite sides of the primary surface, and wherein a protrusion opening is defined in one of the two sidewalls, and a steadying piece provided in the protrusion opening and configured to be in a relaxed state, whereby a protruding piece of the steadying piece protrudes from the protrusion opening into the dovetail socket, and in a receded state, whereby the protruding piece of the steadying piece is at least partially pressed into the protrusion opening in response to a force applied to the steadying piece from the dovetail socket, wherein the connection device is attached or attachable to one of the helmet mount or the goggle bridge, and the other one of the helmet mount or the goggle bridge comprises a dovetail piece shaped and sized to be inserted into the dovetail socket, and wherein the steadying piece is configured to be pressed into the receded state by the dovetail piece in response to the dovetail piece being inserted into the dovetail socket.

29. The connection device of claim 28, further comprising one or more springs positioned in the protrusion opening and coupled to the steadying piece to force the protruding piece of the steadying piece out from the protrusion opening and into the dovetail socket in response to the steadying piece being in the relaxed state.

* * * * *